United States Patent
Kuzuhara et al.

(10) Patent No.: US 10,495,877 B2
(45) Date of Patent: Dec. 3, 2019

(54) FREE-FORM SURFACE LENS AND HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP); Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 15/779,056

(22) PCT Filed: Nov. 28, 2016

(86) PCT No.: PCT/JP2016/004976
§ 371 (c)(1),
(2) Date: May 24, 2018

(87) PCT Pub. No.: WO2017/094248
PCT Pub. Date: Jun. 8, 2017

(65) Prior Publication Data
US 2018/0356631 A1 Dec. 13, 2018

(30) Foreign Application Priority Data
Dec. 1, 2015 (JP) .................. 2015-234371

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60K 37/04* (2013.01);
(Continued)

(58) Field of Classification Search
CPC .... G02B 27/0101; G02B 3/02; G02B 5/3025; G02B 5/3083; G02B 2027/012;
(Continued)

(56) References Cited

U.S. PATENT DOCUMENTS 10,031,343 B2 * 7/2018 Saisho ............... G02B 27/0101
2011/0128602 A1 6/2011 Hamano et al.
(Continued)

FOREIGN PATENT DOCUMENTS

JP 2004-126025 4/2004
JP 2010-049232 3/2010
(Continued)

OTHER PUBLICATIONS

International Search Report of PCT application No. PCT/JP2016/004976 dated Feb. 7, 2017.

*Primary Examiner* — Rodney Amadiz
(74) *Attorney, Agent, or Firm* — Greenblum & Bernstein, P.L.C.

(57) ABSTRACT

Head-up display includes display device and projection optical system. Display device displays an image. Projection optical system includes refraction lens. Projection optical system projects the image displayed on display device to an observer. Refraction lens is disposed while inclined with respect to a reference beam. An incident surface of refraction lens is a concave surface relative to a side of display device in an X-axis direction. A curvature in a Y-axis direction of the incident surface is smaller than a curvature in the X-axis direction.

18 Claims, 19 Drawing Sheets

(51) Int. Cl.
*G02B 3/02* (2006.01)
*B60K 37/04* (2006.01)
*G02B 5/30* (2006.01)
*B60W 50/14* (2012.01)

(52) U.S. Cl.
CPC .......... *G02B 3/02* (2013.01); *B60K 2370/334* (2019.05); *B60K 2370/39* (2019.05); *B60R 2300/205* (2013.01); *B60W 2050/146* (2013.01); *G02B 5/3025* (2013.01); *G02B 5/3083* (2013.01); *G02B 2027/012* (2013.01)

(58) Field of Classification Search
CPC .... B60K 37/04; B60K 35/00; B60K 2370/39; B60K 2370/334; B60K 2370/1529; B60K 37/02; B60R 2300/205; B60W 2050/146
USPC .......................................................... 345/7
See application file for complete search history.

(56) References Cited

U.S. PATENT DOCUMENTS

| | | |
|---|---|---|
| 2014/0184996 A1 | 7/2014 | Matsushita et al. |
| 2015/0219803 A1* | 8/2015 | Inamoto ............... G02B 3/0043 359/627 |
| 2016/0377776 A1 | 12/2016 | Ichihashi |

FOREIGN PATENT DOCUMENTS

| | | |
|---|---|---|
| JP | 2010-152025 A | 7/2010 |
| JP | 2011-247997 | 12/2011 |
| JP | 2013-041182 | 2/2013 |
| JP | 2013-057897 A | 3/2013 |
| JP | 2014-044244 A | 3/2014 |
| JP | 2015-049272 A | 3/2015 |
| WO | 2015/141759 A1 | 9/2015 |

* cited by examiner

FREE-FORM SURFACE LENS AND HEAD-UP DISPLAY

CROSS-REFERENCE TO RELATED APPLICATIONS

This application is a U.S. national stage application of the PCT International Application No. PCT/JP2016/004976 filed on Nov. 28, 2016, which claims the benefit of foreign priority of Japanese patent application No. 2015-234371 filed on Dec. 1, 2015, the contents all of which are incorporated herein by reference.

TECHNICAL FIELD

The present disclosure relates to a head-up display that projects light on a transparent reflection member to present a virtual image, and to a free-form surface lens and the like used to project the light.

BACKGROUND ART

PTL 1 discloses a head-up display device that projects a displayed image on a windshield. The head-up display device includes a liquid crystal display, a standard light source, a concave mirror, and a concave lens. The liquid crystal display generates a basic image to be a base of a displayed image. The standard light source radiates light from a rear surface side toward the liquid crystal display. The concave mirror reflects a light image of the basic image to project a displayed image on a windshield. The concave lens has a plano-concave lens shape in which a flat surface is oriented toward a liquid crystal display side. The concave lens is positioned between the liquid crystal display and the concave mirror.

PTL 2 discloses a head-up display device that projects a displayed image on a windshield. The head-up display device includes a liquid crystal display, a standard light source, a concave mirror, and a free-form surface lens. The liquid crystal display generates a basic image to be a base of a displayed image. The standard light source radiates light from a rear surface side toward the liquid crystal display. The concave mirror reflects a light image of the basic image to project a displayed image on the windshield. The free-form surface lens has a plano-concave lens shape in which a flat surface is oriented toward a liquid crystal display side. The free-form surface lens is positioned between the liquid crystal display and the concave mirror.

CITATION LIST

Patent Literatures

PTL 1: Unexamined Japanese Patent Publication No. 2004-126025
PTL 2: Unexamined Japanese Patent Publication No. 2011-247997

SUMMARY OF THE INVENTION

Technical Problem

The present disclosure provides a head-up display that presents a high-contrast, little distortion virtual image to effectively prevent stray light caused by external light.

Solution to Problem

A head-up display of the present disclosure is a head-up display that causes an observer to visually recognize a virtual image. The head-up display includes a display device and a projection optical system. The display device displays an image. The projection optical system includes a refraction lens. The projection optical system projects the image displayed on the display device onto the observer. It is assumed that a reference beam is a beam that reaches a center in a viewpoint region of the observer and corresponds to a center of the virtual image. It is assumed that a reference outside beam is a beam that reaches the center in the viewpoint region of the observer and corresponds to a vehicle outside end of the virtual image. An incident surface of the refraction lens is a surface on a display device side on the reference beam. An output surface of the refraction lens is a surface on an opposite side to the incident surface on the reference beam. It is assumed that an origin is an intersection of the reference beam and the incident surface. It is assumed that an X-axis direction is a direction of a straight line including the origin and an intersection of a tangential plane of the incident surface at the origin and the reference outside beam. It is assumed that a Y-axis direction is a direction perpendicular to the X-axis direction in the tangential plane. At this point, the refraction lens is disposed while inclined with respect to the reference beam. The incident surface has a concave surface relative to the display device side in the X-axis direction. A curvature in the Y-axis direction of the incident surface is smaller than a curvature in the X-axis direction of the incident surface.

Advantageous Effect of Invention

The head-up display of the present disclosure is effective in presenting the high-contrast, little distortion virtual image to prevent the stray light caused by the external light.

DESCRIPTION OF EMBODIMENTS

Hereinafter, exemplary embodiments will be described in detail with reference to the drawings as appropriate. However, the detailed description more than necessary may be omitted. For example, the detailed description of already known matters and the overlapping description of the substantially same configuration may be omitted. Such omissions are aimed to prevent the following description from being redundant more than necessary, and to help those skilled in the art to easily understand the following description.

Note that the attached drawings and the following description are provided for those skilled in the art to fully understand the present disclosure, and are not intended to limit the subject matter as described in the appended claims.

First Exemplary Embodiment

A first exemplary embodiment will be described below with reference to FIGS. 1 to 6.

[1-1. Configuration]
[1-1-1. Overall Configuration of Head-Up Display]

Specific exemplary embodiments and examples of head-up display 100 of the present disclosure will be described below with reference to the drawings.

Figure 1:
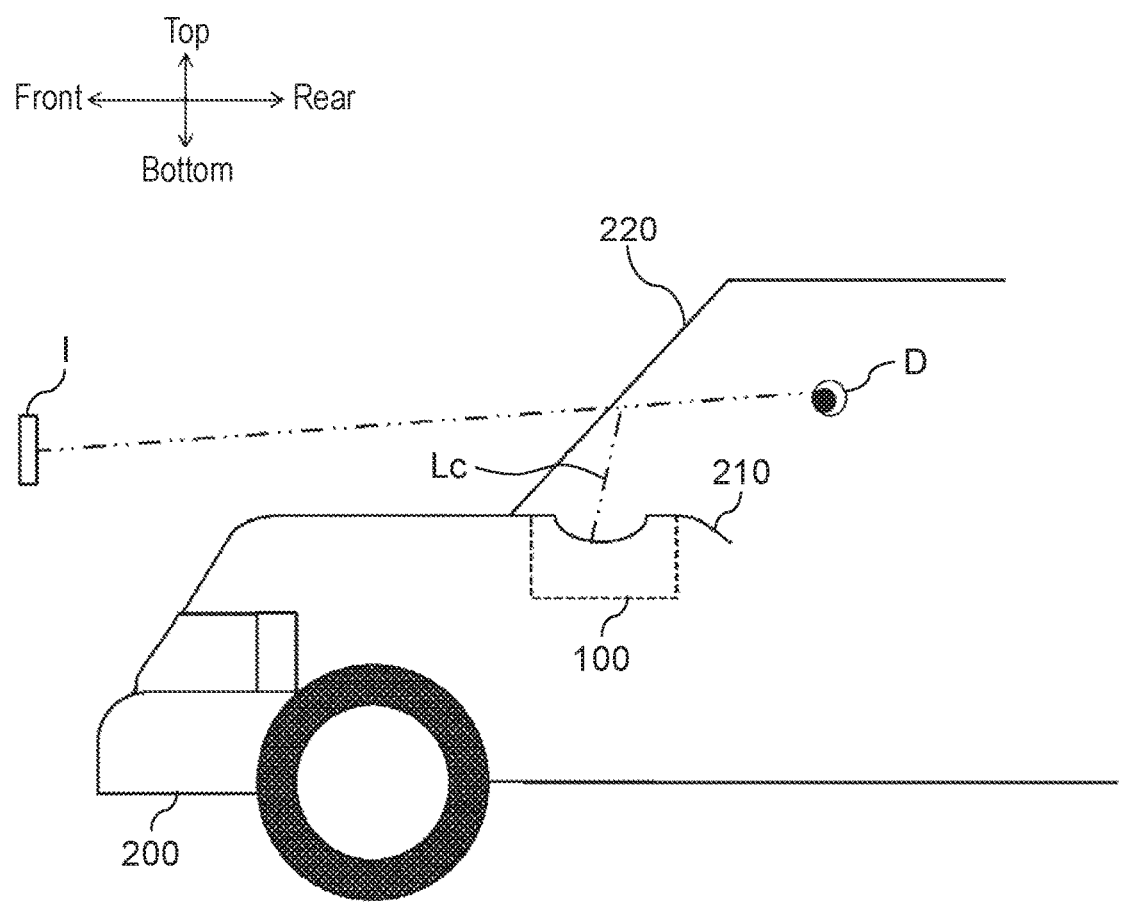
FIG. 1 is schematic diagram illustrating a vehicle equipped with a head-up display according to a first exemplary embodiment.

FIG. 1 is a view illustrating a section of vehicle 200 equipped with head-up display 100 of the present disclosure. As illustrated in FIG. 1, head-up display 100 is disposed in dashboard 210 below windshield 220 of vehicle 200. Observer D recognizes an image projected from head-up display 100 as virtual image I.

Figure 2:
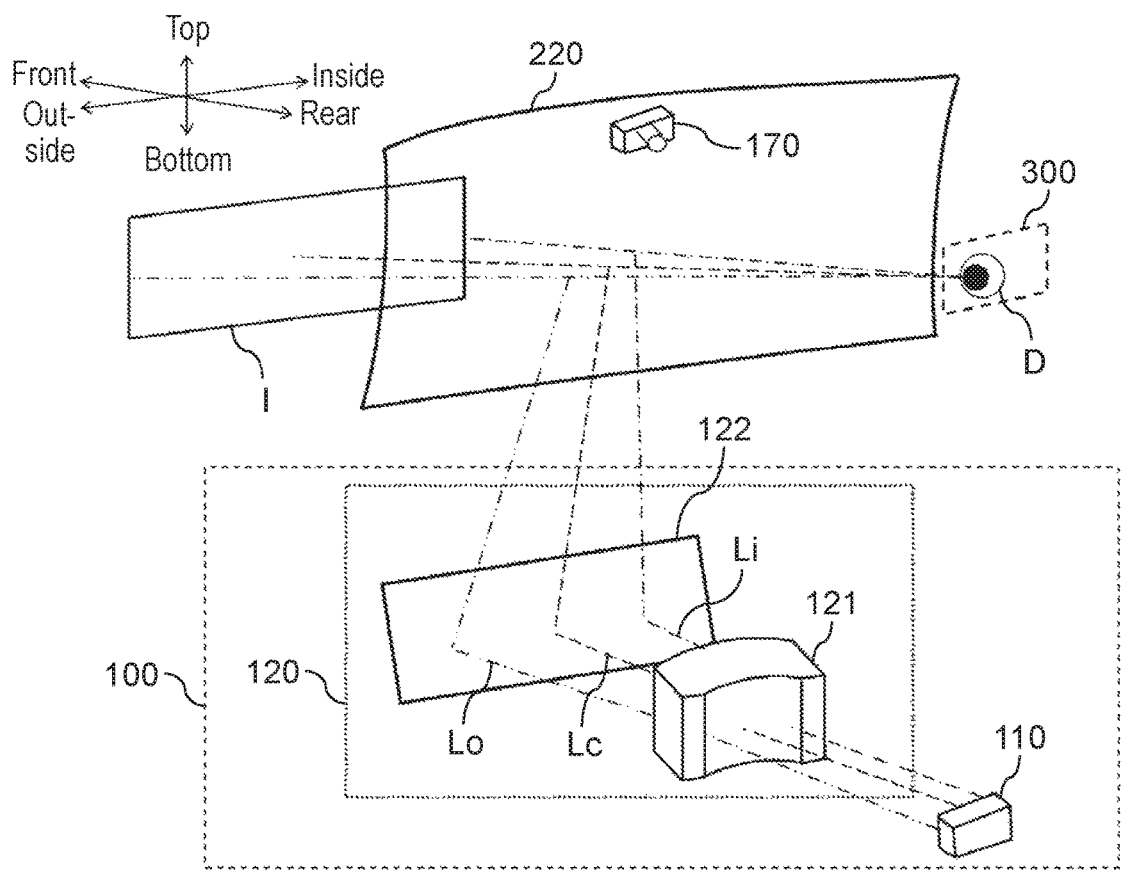
FIG. 2 is a schematic diagram illustrating a configuration of the head-up display of the first exemplary embodiment.

FIG. 2 is a schematic diagram illustrating a configuration of head-up display 100 of the first exemplary embodiment.

Figure 3:
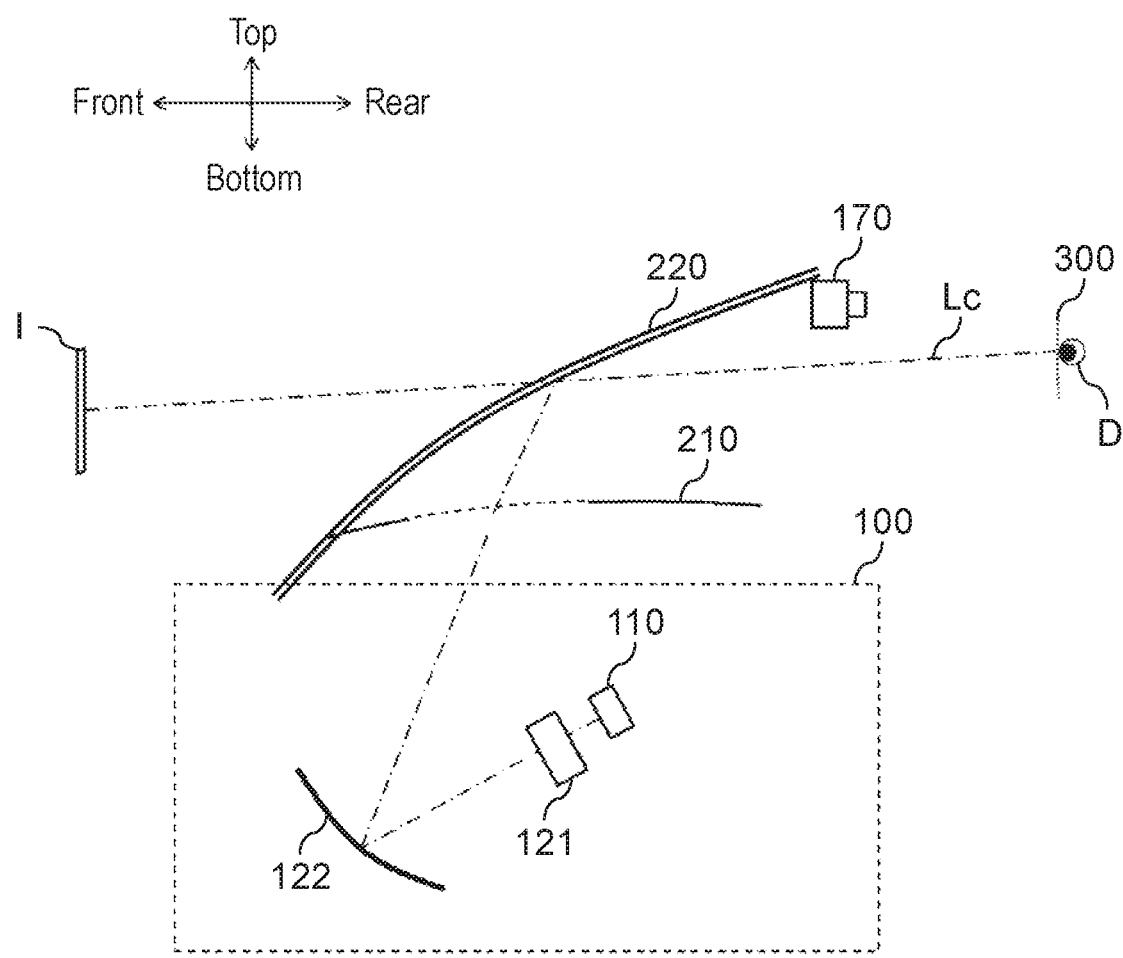
FIG. 3 is a schematic diagram illustrating the configuration of the head-up display of the first exemplary embodiment.

FIG. 3 is a schematic diagram illustrating the configuration of head-up display 100 of the first exemplary embodiment.

As illustrated in FIG. 2, head-up display 100 includes display device 110 and projection optical system 120. Head-up display 100 projects an image displayed by display device 110 onto windshield 220. The projected light is reflected by windshield 220, and guided to viewpoint region 300 of observer D. Consequently, head-up display 100 causes observer D to visually recognize virtual image I.

In the present disclosure, a front refers to a direction in which the windshield of vehicle 200 exists as seen from observer D. A rear refers to an opposite direction to the front. A bottom refers to a direction of a ground on which vehicle 200 runs. A top refers to an opposite direction to the bottom. An outside refers to a left side as seen from observer D in the case where vehicle 200 is a left-hand drive car. At this point, an inside refers to a right side as seen from the observer. Viewpoint region 300 is a region where observer D can visually recognize complete virtual image I.

As illustrated in FIG. 2, it is assumed that reference beam Lc is an optical path from a center of the image in display device 110 to a viewpoint of observer D. That is, when seen from observer D, reference beam Lc corresponds to the optical path from the center of virtual image I to the viewpoint of observer D. It is assumed that a reference outside image end is a display position on display device 110, the display position corresponding to a vehicle outside end of virtual image I. It is assumed that a reference inside image end is a display position on display device 110, the display position corresponding to a vehicle inside end of virtual image I. It is assumed that reference outside beam Lo is an optical path from the reference outside image end of display device 110 to the viewpoint of observer D. That is, reference outside beam Lo is the optical path of the light corresponding to the vehicle outside end of virtual image I. Similarly, it is assumed that reference inside beam Li is an optical path from the reference inside image end of display device 110 to the viewpoint of observer D. At this point, it is assumed that the viewpoint of observer D is located in the center of viewpoint region 300.

Display device 110 displays displayed image 111 under the control of a controller such as a CPU (not illustrated). For example, a liquid crystal display with a backlight, an organic light emitting diode (electroluminescence), a plasma display, and the like can be used as display device 110. An image may be generated using a screen that diffuses or reflects the light and a projector or a scanning laser as display device 110. Various pieces of information such as road traffic navigation display, a distance to a vehicle ahead, a remaining battery amount of a vehicle, and a current vehicle speed can be displayed on display device 110. Display device 110 can cause observer D to visually recognize good virtual image I by electronically distorting the image in advance according to a distortion generated in projection optical system 120 or windshield 220 and a position of observer D obtained by camera 170. Display device 110 can also cause observer D to visually recognize good virtual image I by displaying display pixels of a plurality of wavelengths while displacing the display pixel in each display position in advance according to a chromatic aberration generated in the projection optical system 120.

Projection optical system 120 includes lens 121 having a free-form surface shape and mirror 122 having a concave reflection surface. Projection optical system 120 projects the image displayed by display device 110 onto windshield 220. Specifically, image light displayed by display device 110 is incident on mirror 122 through lens 121. Mirror 122 reflects the image light and projects the reflected image light onto windshield 220.

[1-1-2. Configuration of Projection Optical System]

A configuration of projection optical system 120 will be described below with reference to FIGS. 2 to 4 and 18A to 18D.

Figure 4:
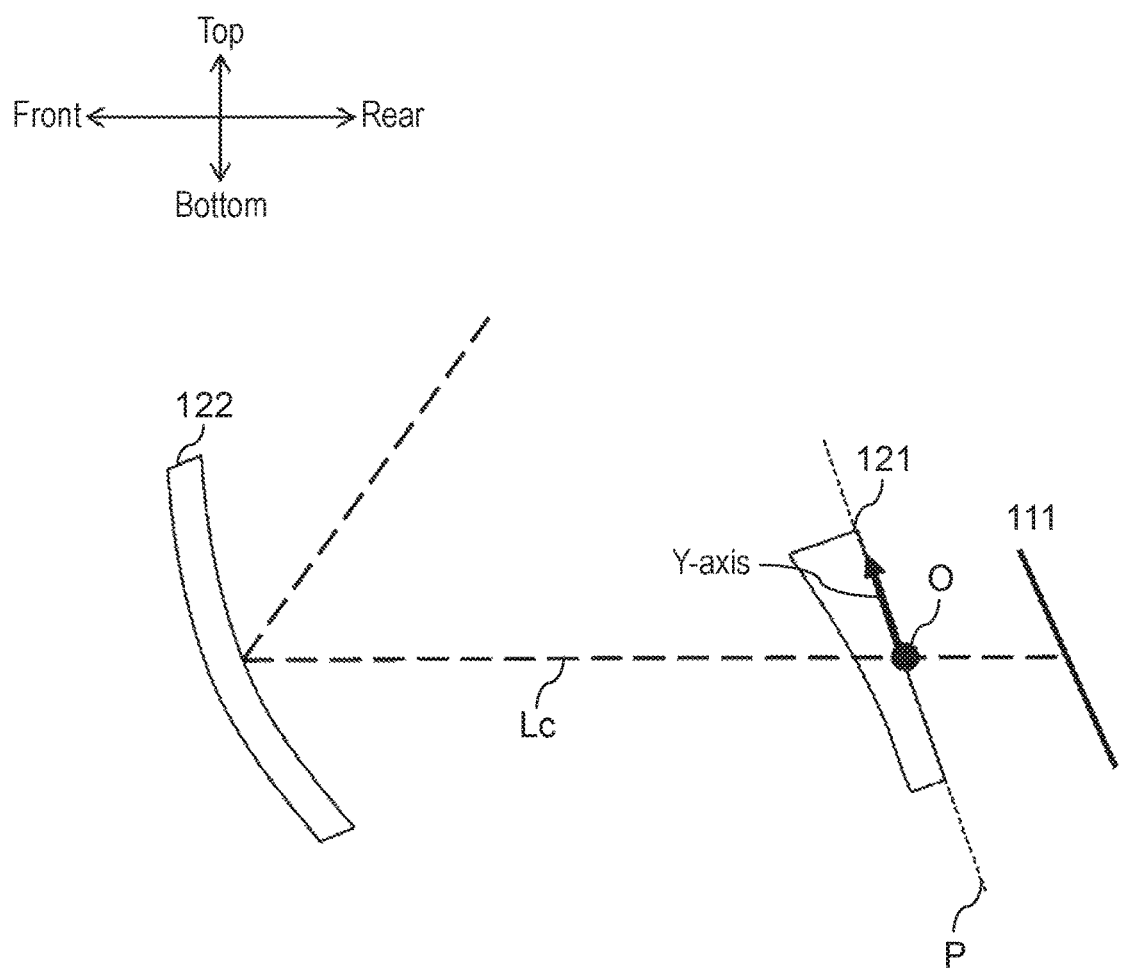
FIG. 4 is a schematic diagram illustrating a configuration of a projection optical system of the first exemplary embodiment.

As illustrated in FIG. 3, lens 121 is located on a front side of vehicle 200 with respect to display device 110. As illustrated in FIG. 4, lens 121 is disposed while inclined downward with respect to reference beam Lc.

As illustrated in FIGS. 18A to 18D, lens 121 is a free-form surface lens in which an X-axis direction and a Y-axis direction differ from each other in a curvature. A surface (incident surface) facing 110 of lens 121 has a concave shape that is concave to the side of display device 110 in the X-axis direction. In the incident surface of lens 121, the curvature in the Y-axis direction is smaller than the curvature in the X-axis direction. That is, the shape of lens 121 in the Y-axis direction has a concave, convex, or planar shape in which the curvature in the Y-axis direction is smaller than that in the X-axis direction. A surface (output surface), on the side of mirror 122, of lens 121 has a convex shape that is convex to the side of mirror 122 in the X-axis direction. The output surface of lens 121 has a concave shape in the Y-axis direction. In the first exemplary embodiment, by way of example, the incident surface of lens 121 has a shape so as not to have refractive power in the Y-axis direction. In the incident surface of lens 121, a concave surface in which the curvature is smaller than that in the X-axis direction may be oriented toward the side of display device 110. In the incident surface of lens 121, a convex surface may be oriented toward the side of display device 110. Alternatively, the incident surface of lens 121 may have a shape that is locally concave, convex, or planar to the side of display device 110. In the first exemplary embodiment, the concave surface is oriented toward the side of mirror 122 in the Y-axis direction of the output surface of lens 121. Alternatively, the convex surface is oriented toward the side of mirror 122.

When external light such as sunlight is incident on lens 121 from mirror 122, the external light is reflected by the output surface or incident surface of lens 121. When the light reflected by lens 121 is incident on mirror 122, possibly the external light is projected onto windshield 220, and is visually recognized by observer D. It is undesirable because the external light disturbs a viewing field of observer D who drives vehicle 200.

In the first exemplary embodiment, as illustrated in FIG. 4, the incident surface and the output surface of lens 121 are inclined downward with respect to reference beam Lc. That is, lens 121 is inclined downward with respect to reference beam Lc. Consequently, the reflected light is reflected downward by mirror 122 so as not to be incident on viewpoint region 300. At this point, desirably inclination of lens 121 with respect to reference beam Lc is an angle at which the reflected light of the external light is not incident on mirror 122 when the external light incident along reference beam Lc is reflected by the incident surface or output surface of lens 121. More desirably, the inclination of lens 121 with respect to reference beam Lc is an angle at which the reflected light of the external light is not incident on mirror 122 when the external light incident on lens 121 from mirror 122 is reflected by the incident surface or output surface of lens 121. The inclination of lens 121 with respect to reference beam Lc means that an optical refraction surface of lens 121 is not horizontal to a plane perpendicular to reference beam Lc.

The output surface of lens 121 is provided while oriented more downward than the incident surface. That is, the shape, in the Y-axis direction, of lens 121 has a wedge shape. When a sectional shape, along the Y-axis direction, of lens 121 is formed into the wedge shape, an optical path length of the light passing through the upper part of lens 121 is longer than an optical path length of the light passing through the lower part of lens 121. That is, the optical path length until video light output from display device 110 reaches mirror 122 can be changed according to a position, in the Y-axis direction, of the light. Consequently, eccentric field curvature generated in mirror 122 can successfully be corrected.

Figure 5:
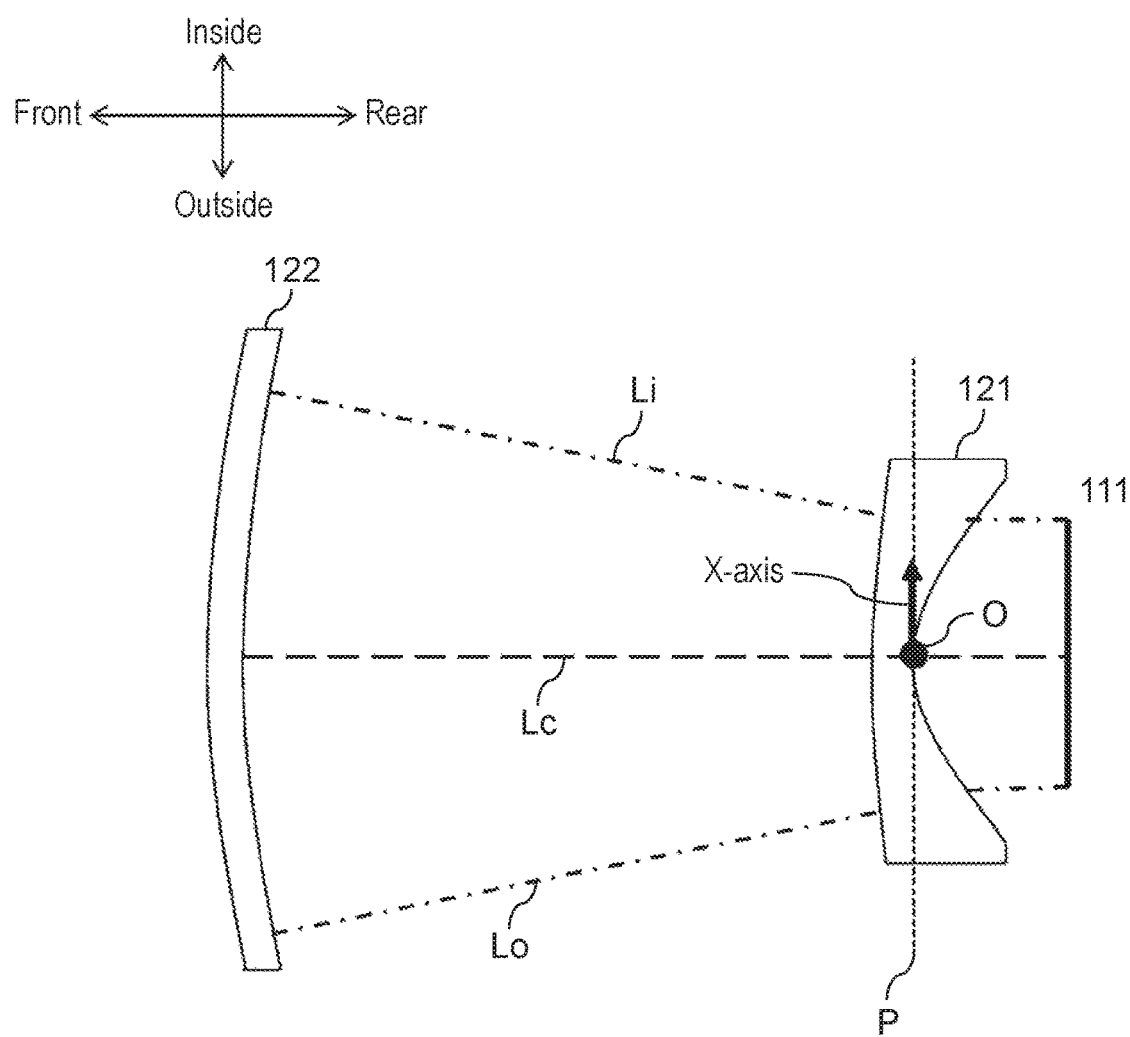
FIG. 5 is a schematic diagram illustrating the configuration of the projection optical system of the first exemplary embodiment.

As illustrated in FIG. 5, it is assumed that origin O is an intersection of reference beam Lc and the incident surface of lens 121. It is assumed that tangential plane P is a tangential plane of the incident surface of lens 121 at origin O. It is assumed that an X-axis is a straight line including origin O and an intersection of reference outside beam Lo and tangential plane P. It is assumed that a Y-axis is a straight line perpendicular to the X-axis on tangential plane P. In FIG. 5, an inside and outside direction of the vehicle is matched with the X-axis direction. However, the present disclosure is not limited thereto.

Mirror 122 is located on the front side of vehicle 200 with respect to lens 121. Mirror 122 reflects the beam output from lens 121 toward windshield 220. A reflection surface of mirror 122 is eccentrically disposed. The reflection surface of mirror 122 has a concave shape. That is, mirror 122 projects the light incident from lens 121 onto windshield 220 while enlarging the light. Consequently, the image displayed on display device 110 can be enlarged and visually recognized as virtual image I by observer D. Mirror 122 has a free-form surface shape. This is because distortion of the virtual image due to the reflection is corrected. This enables observer D to see good virtual image I in whole viewpoint region 300.

At this point, the incident surface of lens 121 is subjected to anti-reflective coating by a multi-layer structure of a thin film. This enables reflectance to be reduced in the incident surface of lens 121.

At this point, the output surface of lens 121 is subjected to the anti-reflective coating by the multi-layer structure of the thin film. This enables reflectance to be reduced in the incident surface of lens 121. At this point, lens 121 is disposed at a higher position relative to a lower end of the reflection surface of mirror 122. This enables head-up display 100 to be thinned in a top-bottom direction of vehicle 200.

For example, a fine periodical structure such as a sub wavelength structure (SWS) may be used as the anti-reflective coating.

[1-2. Effects and Others]

Head-up display 100 (an example of the head-up display) of the first exemplary embodiment is a head-up display that causes observer D to visually recognize virtual image I. Head-up display 100 includes display device 110 (an example of the display device) and projection optical system 120. Display device 110 displays the image. Projection optical system 120 includes lens 121 (an example of the refraction lens), and projects the image displayed on display device 110 onto observer D. It is assumed that reference beam Lc is a beam from the center of virtual image I toward the viewpoint of observer D when the viewpoint of observer D exists in the center of viewpoint region 300. It is assumed that reference outside beam Lo is a beam from the vehicle outside end of virtual image I toward the viewpoint of observer D when the viewpoint of observer D exists in the center of viewpoint region 300. The incident surface of lens 121 is an optical surface facing 110 on reference beam Lc. The output surface of lens 121 is an optical surface on the opposite side to the incident surface on reference beam Lc. It is assumed that origin O is the intersection of reference beam Lc and the incident surface of lens 121. It is assumed that tangential plane P is the tangential plane of the incident surface of lens 121 at origin O. It is assumed that the X-axis direction is a direction of the straight line including origin O and the intersection of reference outside beam Lo and tangential plane P. It is assumed that the Y-axis direction is a direction perpendicular to the X-axis direction in tangential plane P. Lens 121 is disposed oblique to reference beam Lc. The incident surface, facing 110, of lens 121 forms a concave surface with respect to the side of display device 110 in the X-axis direction. The curvature of the incident surface of lens 121 in the Y-axis direction is smaller than the curvature of the incident surface in the X-axis direction.

Lens 121 (an example of the free-form surface lens) of the first exemplary embodiment is used in an imaging optical system that makes a conjugate relationship between a first image surface and a second image surface. The free-form surface lens of the present disclosure includes a first optical surface and a second optical surface as the optical surface. The first optical surface corresponds to the incident surface of lens 121. The second optical surface corresponds to the output surface of lens 121. The imaging optical system of head-up display 100 forms a real image (first image surface) that is the image displayed on display device 110 as virtual image I (second image surface) visually recognized by observer D. That is, the imaging optical system of head-up display 100 makes the conjugate relationship between the first image surface and the second image surface using lens 121. Reference beam Lc of head-up display 100, namely, the beam corresponding to the center of the second image surface passes through the first optical surface and second optical surface of lens 121. At this point, it is assumed that tangential plane P is the tangential plane of the first optical surface at the intersection of reference beam Lc and the first optical surface. The X-axis direction and Y-axis direction of lens 121 are two directions orthogonal to each other in tangential plane P, and are similar to those in FIGS. 18A to 19D.

According to the free-form surface lens of the present disclosure, in the imaging optical system of head-up display 100, a good optical characteristic can be provided while the reflection of the external light is prevented.

In lens 121, the curvature in the X-axis direction means the curvature of the sectional shape in the plane, which includes the X-axis and is perpendicular to the Y-axis direction. The curvature in the Y-axis direction means the curvature of the sectional shape in the plane, which includes the Y-axis and is perpendicular to the X-axis direction.

Projection optical system 120 of head-up display 100 includes lens 121 and mirror 122 in order from display device 110 on the optical path.

Head-up display 100 of the first exemplary embodiment projects the image displayed on display device 110 onto windshield 220, and causes observer D to visually recognize virtual image I. Consequently, observer D can visually recognize the image displayed on display device 110 without obstructing a front viewing field of observer D.

According to head-up display 100 of the present disclosure, a small head-up display in which image distortion is successfully corrected on whole viewpoint region 300 can be constructed. According to the configuration of the present disclosure, furthermore, a head-up display that prevents generation of stray light caused by the external light can be constructed. That is, observer D can visually recognize good virtual image I even if observer D observes virtual image I at any position in viewpoint region 300.

Figure 6:
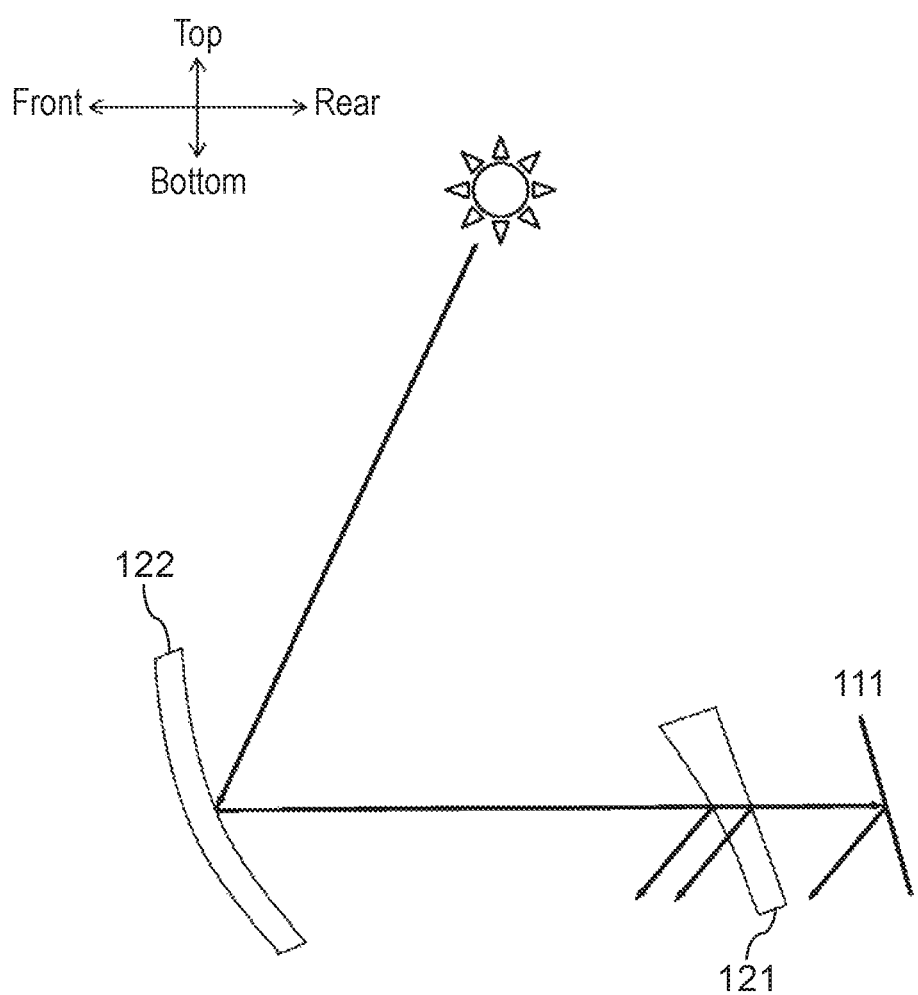
FIG. 6 is a view illustrating a state in which external light is incident on the head-up display of the first exemplary embodiment.

Lens 121 of the first exemplary embodiment is disposed while inclined downward with respect to reference beam Lc. Consequently, the external light such as the sunlight can be prevented from being incident on viewpoint region 300 even if the external light is reflected by the output surface or incident surface of lens 121 as illustrated in FIG. 6.

The X-axis direction of lens 121 has negative refractive power. Consequently, a spread, in the X-axis direction, of the beam, which is output from display device 110 and is incident on lens 121, can be prevented. This enables head-up display 100 to present virtual image I having the good contrast characteristic.

The shape of Lens 121 in the X-axis direction is a negative meniscus shape in which the concave surface is oriented toward display device 110. Consequently, the angle at which the beam output from display device 110 is incident on the lens surface of lens 121 can be brought close to an angle perpendicular to the incident surface. This enables reduction of an influence of eccentric distortion.

The output surface of lens 121 has a free-form surface shape. Specifically, lens 121 is not symmetric in the X-axis direction. Consequently, in lens 121, asymmetric distortion generated in windshield 220 can successfully be corrected.

The Y-axis direction of the output surface of lens 121 is inclined downward compared with the Y-axis direction of the incident surface of lens 121. That is, based on the plane perpendicular to reference beam Lc, the inclination in the Y-axis direction of the output surface of lens 121 is larger than the inclination in the Y-axis direction of the incident surface of lens 121. In other words, an angle formed between reference beam Lc and the tangential plane at the intersection of reference beam Lc and the output surface is smaller than an angle formed between reference beam Lc and the tangential plane at the intersection of reference beam Lc and the incident surface. When the incident surface and the output surface of lens 121 are inclined, the reflected light of the sunlight can be prevented from being incident on viewpoint region 300 even if the sunlight is reflected on the output surface side. Since the Y-axis direction of the output surface of lens 121 is inclined downward compared with the Y-axis direction of the incident surface of lens 121, the optical path length of the light passing through the upper part of lens 121 is longer than the optical path length of the light passing through the lower part of lens 121. This enables the optical path length to be changed according to the position, in the Y-axis direction, of the light passing through lens 121. Consequently, the eccentric field curvature generated in mirror 122 can successfully be corrected.

The incident surface of lens 121 is subjected to the anti-reflective coating. Consequently, observer D can visually recognize good virtual image I without decreasing transmittance of the image displayed on display device 110. Luminance can sufficiently be decreased even if the external light such as the sunlight is multiple-reflected between the incident surface and the output surface of lens 121 to reach viewpoint region 300.

The output surface of lens 121 is subjected to the anti-reflective coating. Consequently, observer D can visually recognize good virtual image I without decreasing transmittance of the image displayed on display device 110. The luminance can sufficiently be decreased even if the external light such as the sunlight is multiple-reflected between the incident surface and the output surface of lens 121 to reach viewpoint region 300.

Generally, the luminance of the light multiple-reflected between the incident surface and the output surface is lower than the luminance of the light reflected by the incident surface or the output surface only once. Even if the luminance of the multiple-reflected light is degraded, the effect is insufficiently obtained when the luminance of the light reflected only once is insufficiently decreased. In the first exemplary embodiment, since the incident surface and the output surface are inclined to reference beam Lc, the light reflected by the incident surface or the output surface only once does not reach mirror 122. Consequently, the large effect is obtained by preventing the multiple-reflected light.

In the multiple-reflected light, the reflected light, which is reflected by the incident surface, reflected by the output surface, reflected by the incident surface, and reaches mirror 122, will be described below. At this point, it is assumed that Ri is reflectance in the incident surface. Similarly, it is assumed that Ro is reflectance in the output surface. The luminance of the reflected light is roughly proportional to a value in which a square of Ri and Ri are multiplied. In particular, the luminance of the reflected light can efficiently be decreased by the incident surface being subjected to the anti-reflective coating. The luminance of the reflected light can also be decreased in roughly proportional to the decrease of Ro in the case where the output surface is subjected to the anti-reflective coating. Because the luminance of the reflected light is proportional to Ri+Ro in the light reflected only once, the luminance of the reflected light is not proportional to Ro even if only Ro is decreased. According to the configuration of the present disclosure, the luminance of the reflected light can effectively be decreased by the output surface being subjected to the anti-reflective coating. Similarly, according to the configuration of the present disclosure, the luminance of the reflected light can effectively be decreased in the case where both the incident surface and the output surface are subjected to the anti-reflective coating.

In projection optical system 120, lens 121 having negative power as a whole is disposed immediately after display device 110. In lens 121, a surface on which the light of displayed image 111 displayed on display device 110 is firstly incident is a concave surface. This enables enhancement of the positive power of mirror 122. Consequently, head-up display 100 can be reduced in size.

Lens 121 of the first exemplary embodiment is a concave lens as a whole. That is, lens 121 is an optical element that acts as the concave lens in both the X-axis direction and the Y-axis direction. Consequently, lens 121 can be used as the concave lens in the imaging optical system. Lens 121 is the free-form surface lens. Consequently, the optical characteristic of the imaging optical system can successfully be corrected.

The first optical surface (incident surface) of lens 121 of the first exemplary embodiment is the concave surface in the X-axis direction. The curvature of the first optical surface in the Y-axis direction is smaller than the curvature of the first optical surface in the X-axis direction. In the X-axis direction of lens 121, an incident angle of the light from the first image surface is increased in a portion far away from the center of the first optical surface by increasing the curvature of the first optical surface in the X-axis direction. Consequently, in the X-axis direction of lens 121, the degradation of the optical characteristic can be prevented in the portion far away from the center. In particular, when the length in the X-axis direction of lens 121 is longer than the length in the Y-axis direction of lens 121, generally the X-axis direction is larger than the Y-axis direction in the degradation of the optical characteristic in the portion far away from the center of lens 121. When the length in the X-axis direction of lens 121 is longer than the length in the Y-axis direction of lens 121, the curvature of the first optical surface in the Y-axis direction is smaller than the curvature of the first optical surface in the X-axis direction, so that the degradation of the optical characteristic can effectively be prevented. Note that, the length is not limited to the length in the outer shape of lens 121. That is, the same holds true for the case where the length corresponding to the X-axis direction of virtual image I is longer than the length corresponding to the Y-axis direction of virtual image I.

The second optical surface (output surface) of lens 121 of the first exemplary embodiment is the convex surface in the X-axis direction. Consequently, the shape, in the X-axis direction, of the first optical surface can be formed into the concave surface having the large curvature. The curvature of the second optical surface in the X-axis direction is smaller than the curvature of the first optical surface in the X-axis direction. Furthermore, the curvature of the second optical surface in the Y-axis direction is smaller than the curvature of the second optical surface in the X-axis direction. Consequently, the optical characteristic of lens 121 can be set to the concave lens as a whole in the X-axis direction and the Y-axis direction.

The first optical surface and the second optical surface of lens 121 of the first exemplary embodiment are inclined with respect to the plane perpendicular to reference beam Lc. Consequently, the reflected light of the light incident along reference beam Lc is output toward a direction different from reference beam Lc. Furthermore, the sectional shape in the plane perpendicular to the X-axis direction of lens 121 is the wedge shape. That is, the center (optical center) of the curved shape, in the Y-axis direction, of lens 121 is located away from the center of lens 121, for example, outside lens 121. Generally, in the portion away from the optical center in the concave lens, the optical path length is lengthened and the optical characteristic becomes uneven in the plane of lens 121 compared with the portion close to the optical center. On the other hand, in lens 121 of the first exemplary embodiment, the optical path length is changed in the Y-axis direction. Consequently, characteristics of other optical elements are canceled, the optical characteristic of the imaging optical system in which lens 121 is used can be corrected as a whole.

An area of the first image surface of the imaging optical system in which the free-form surface lens of the present disclosure is used is smaller than an area of the second image surface. That is, in the imaging optical system, the second image surface enlarges the first image surface or the first image surface reduces the second image surface. At this point, the optical surface on the first image surface side (reduction side) of lens 121 is the first optical surface. The optical surface on the second image surface side (enlargement side) of lens 121 is the second optical surface. Consequently, the optical characteristic of the imaging optical system can be improved while downsizing of the imaging optical system is achieved.

Second Exemplary Embodiment

Head-up display 100 according to a second exemplary embodiment differs from that of the first exemplary embodiment in that head-up display 100 of the second exemplary embodiment includes quarter-wave plate 123 and polarization cover 101. Points different from the first exemplary embodiment will mainly be described below with reference to FIGS. 7 and 8, and the description about the similar configuration will be omitted.

[2-1. Configuration]

Figure 7:
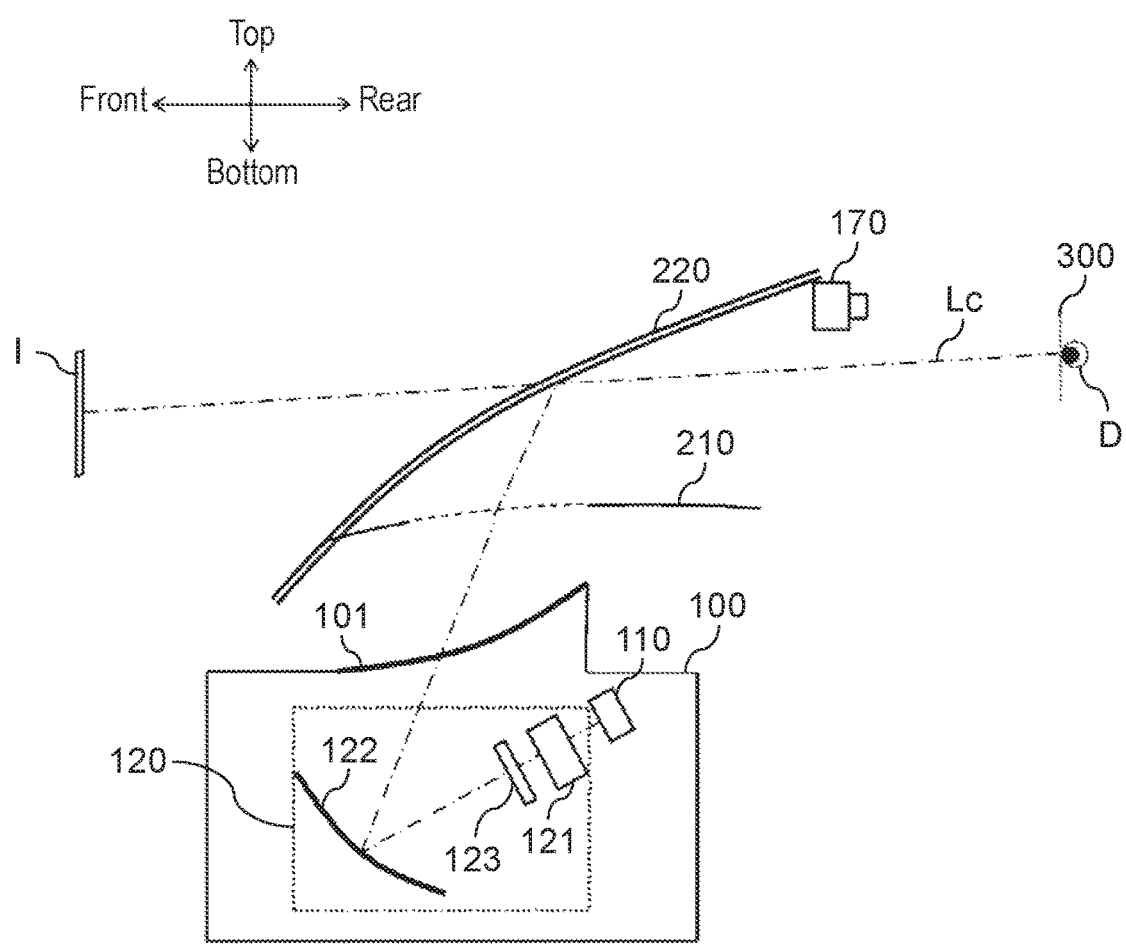
FIG. 7 is a schematic diagram illustrating a configuration of a head-up display according to a second exemplary embodiment.

FIG. 7 is a schematic diagram illustrating an optical path for describing head-up display 100 of the second exemplary embodiment. As illustrated in FIG. 7, head-up display 100 includes polarization cover 101, display device 110, and projection optical system 120. Projection optical system 120 includes lens 121, mirror 122 having a concave reflection surface, and quarter-wave plate 123.

Projection optical system 120 projects the image displayed by display device 110 onto windshield 220. Specifically, image light displayed on display device 110 is incident on mirror 122 through lens 121 and quarter-wave plate 123. The image light reflected by mirror 122 is projected onto windshield 220 through polarization cover 101. In the second exemplary embodiment, polarization cover 101 has action that absorbs P-polarized light while transmitting S-polarized light. However, this is not limiting, polarization cover 101 may have action that absorbs or reflects the S-polarized light while transmitting the P-polarized light. Alternatively, polarization cover 101 may reflect the P-polarized light while transmitting the S-polarized light. Polarization cover 101 has a curved shape. Because polarization cover 101 has the curved shape, the external light such as the sunlight is prevented from being reflected by polarization cover 101 and from reaching viewpoint region 300.

Lens 121 has a configuration similar to that of the first exemplary embodiment. Specifically, lens 121 is located on the front side of vehicle 200 with respect to display device 110, and inclined downward with respect to reference beam Lc. Similarly to FIGS. 18A to 18D, lens 121 is the free-form surface lens having different curvatures in the X-axis direction and the Y-axis direction. A surface (incident surface) facing 110 of lens 121 has a concave shape that is concave to the side of display device 110 in the X-axis direction. The curvature of the incident surface of lens 121 in the Y-axis direction is smaller than curvature in the X-axis direction. The surface (output surface), on the side of mirror 122, of lens 121 has the convex shape that is convex to the side of mirror 122 in the X-axis direction. The output surface of lens 121 has a concave shape in the Y-axis direction. In the second exemplary embodiment, similarly to the first exemplary embodiment, the incident surface of lens 121 has a shape so as not to have the refractive power in the Y-axis direction. In the incident surface of lens 121, a concave surface in which the curvature is smaller than that in the X-axis direction may be oriented toward the side of display device 110. In the incident surface of lens 121, the convex surface may be oriented toward the side of display device 110. Alternatively, the incident surface of lens 121 may have a shape that is locally concave, convex, or planar to the side of display device 110. Similarly to the first exemplary embodiment, the concave surface is oriented toward the side of mirror 122 of the output surface of lens 121 in the Y-axis direction. Alternatively, the convex surface is oriented toward the side of mirror 122.

Similarly to the first exemplary embodiment, the output surface of lens 121 is inclined downward with respect to reference beam Lc compared with the incident surface of lens 121, and the output surface of lens 121 is formed into the wedge shape in the top-bottom and front-rear section of the vehicle. Consequently, even if the external light such as the sunlight is reflected by the output surface and incident surface of lens 121, the reflected light of the external light is not incident on viewpoint region 300. When the sectional shape, along the Y-axis direction, of lens 121 is formed into the wedge shape, the upper optical path length is longer than the lower optical path length, and the eccentric field curvature generated in mirror 122 can successfully be corrected.

Quarter-wave plate 123 is a planar polarizer located on the front side of the vehicle with respect to lens 121. Quarter-wave plate 123 has action that outputs the light output from lens 121 while rotating the polarization of the light by a quarter of wavelength. Quarter-wave plate 123 is disposed while inclined downward with respect to the reference beam. Consequently, the external light can be prevented from reaching viewpoint region 300 even if the external light such as the sunlight is reflected by quarter-wave plate 123.

Mirror 122 is located on the front side of vehicle 200 with respect to quarter-wave plate 123. The reflection surface of mirror 122 is eccentrically disposed so as to reflect the beam output from quarter-wave plate 123 toward windshield 220. The reflection surface of mirror 122 has a concave shape. Consequently, the image displayed on display device 110 can be enlarged and visually recognized as virtual image I by observer D. Mirror 122 has a free-form surface shape. This enables the distortion caused by the reflection to be corrected such that good virtual image I is observed in whole viewpoint region 300.

At this point, lens 121 is disposed at a higher position relative to a lower end of the reflection surface of mirror 122. This enables head-up display 100 to be thinned in a top-bottom direction of vehicle 200.

[2-2. Effects and Others]

Head-up display 100 of the second exemplary embodiment includes display device 110 that displays the image, projection optical system 120 that projects the image displayed on display device 110, and polarization cover 101, and projection optical system 120 includes lens 121, quarter-wave plate 123, and mirror 122 in the order of the optical path from display device 110.

Figure 8:
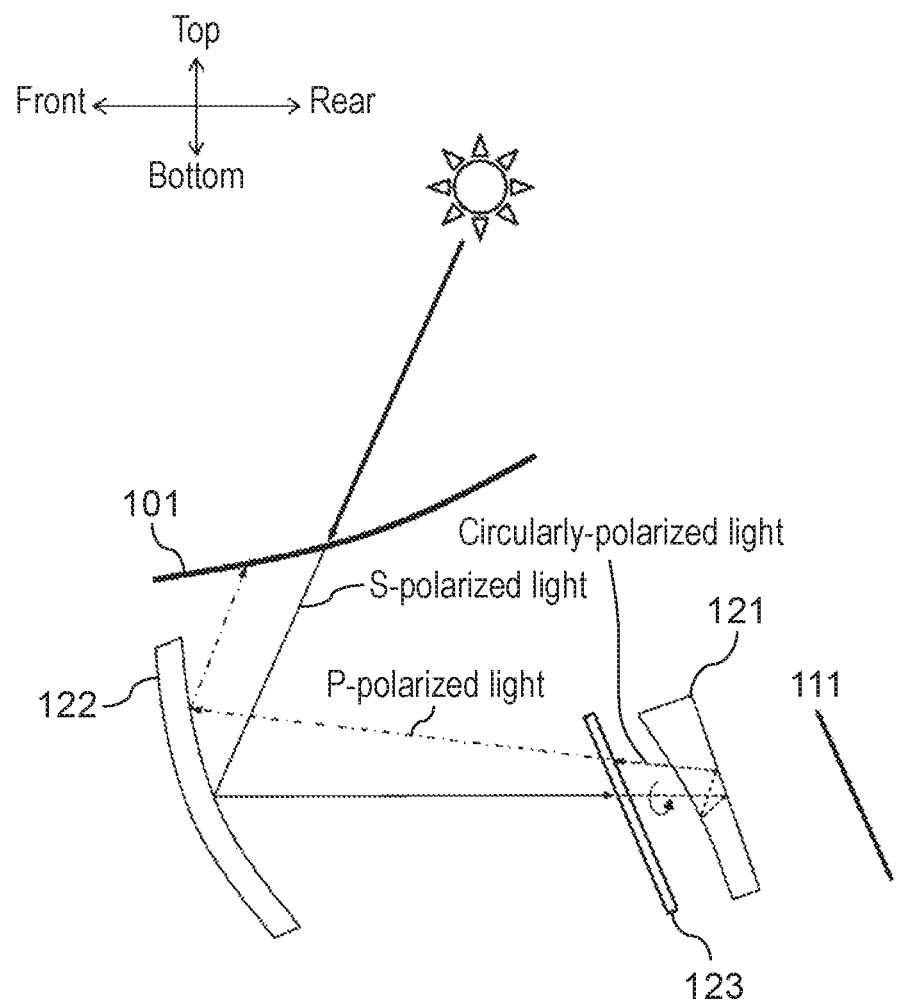
FIG. 8 is a view illustrating a state in which the external light is incident on the head-up display of the second exemplary embodiment.

In addition to the effects of the first exemplary embodiment, in head-up display 100 of the second exemplary embodiment, quarter-wave plate 123 is disposed on the front side of the vehicle with respect to lens 121, and polarization cover 101 is disposed between mirror 122 and windshield 220. Consequently, the luminance can sufficiently be decreased even if the external light such as the sunlight is multiple-reflected by the incident surface or output surface of lens 121 or the display surface of display device 110 to reach viewpoint region 300. As illustrated in FIG. 8, the sunlight is incident on mirror 122 through polarization cover 101. Because polarization cover 101 absorbs the P-polarized light, only the light having an S-polarized component in the sunlight incident on polarization cover 101 reaches mirror 122. The S-polarized component light reaching mirror 122 is reflected by mirror 122, and is incident on quarter-wave plate 123. When the S-polarized component light is transmitted through quarter-wave plate 123, the S-polarized light is converted into circularly-polarized light. The light transmitted through quarter-wave plate 123 is multiple-reflected by the incident surface or output surface of lens 121 or the display surface of display device 110, and is incident on quarter-wave plate 123 again. The circularly-polarized light incident on quarter-wave plate 123 is transmitted through quarter-wave plate 123, and converted into the P-polarized light. That is, when the external light is reflected by lens 121 or display device 110 and is incident on mirror 122 again, the reflected light becomes the P-polarized light. Even if the reflected light of the P-polarized light is reflected by mirror 122 and is incident on polarization cover 101, because polarization cover 101 absorbs the P-polarized light, the reflected light of the P-polarized light cannot pass through polarization cover 101. Consequently, the external light reflected by lens 121 or display device 110 is hardly recognized as the stray light by observer D. In particular, the external light multiple-reflected by lens 121 or display device 110 is hardly recognized as the stray light by observer D.

Third Exemplary Embodiment

Head-up display 100 according to a third exemplary embodiment differs from that of the second exemplary embodiment in that head-up display 100 of the third exemplary embodiment includes quarter-wave plate 124 and half-wave plate 125. Therefore, points different from the second exemplary embodiment will be mainly described below with reference to FIGS. 9 to 11, and the description about the similar configuration will be omitted.

[3-1. Configuration]

Figure 9:
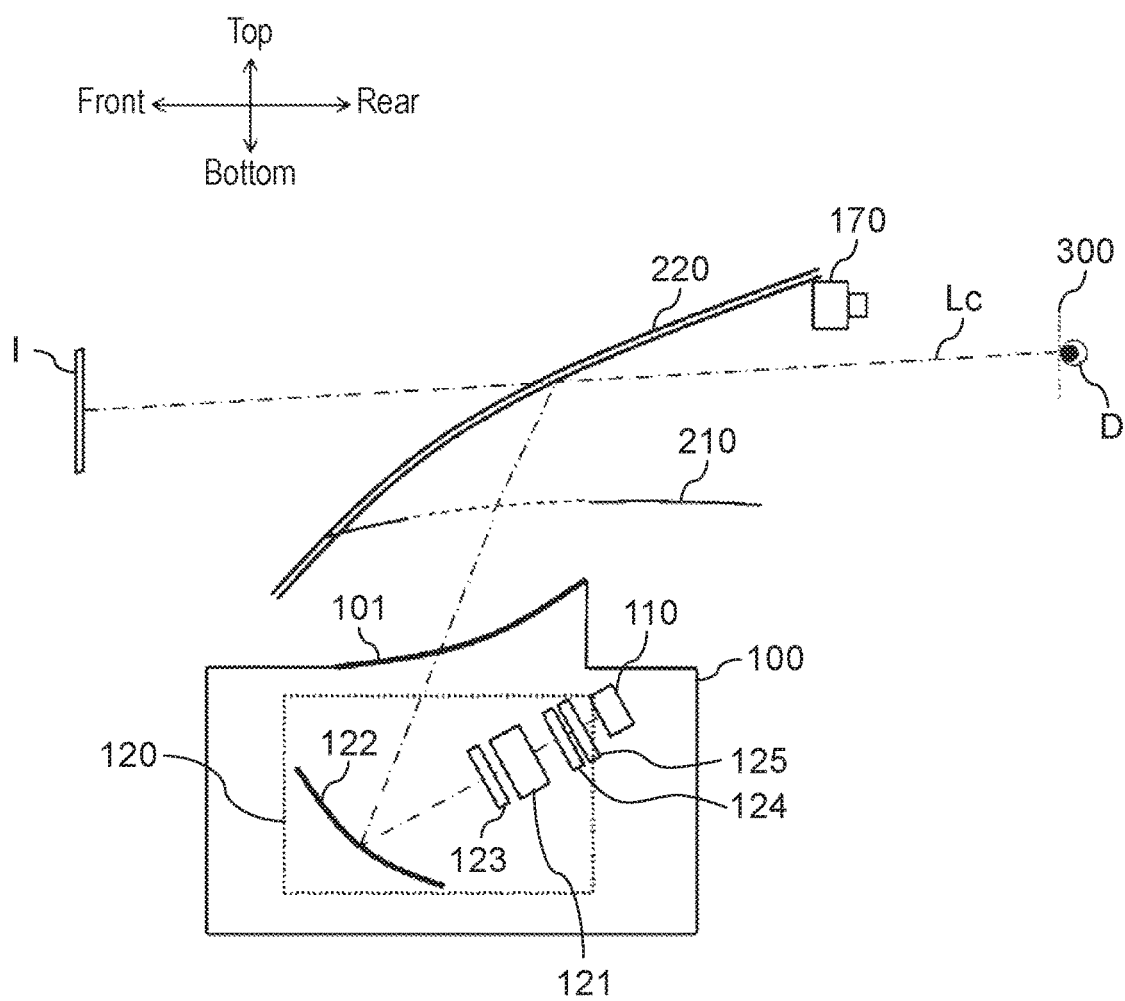
FIG. 9 is a schematic diagram illustrating a configuration of a head-up display according to a third exemplary embodiment.

FIG. 9 is a schematic diagram illustrating an optical path for describing head-up display 100 of the third exemplary embodiment. As illustrated in FIG. 9, head-up display 100 includes polarization cover 101, display device 110, and projection optical system 120. Projection optical system 120 includes lens 121, mirror 122 having the concave reflection surface, quarter-wave plate 123, quarter-wave plate 124, and half-wave plate 125.

Projection optical system 120 projects the image displayed by display device 110 onto windshield 220. Specifically, the image light displayed on display device 110 is incident on mirror 122 through quarter-wave plate 124, half-wave plate 125, lens 121, and quarter-wave plate 123. The image light reflected by mirror 122 is projected onto windshield 220 through polarization cover 101. In the third exemplary embodiment, polarization cover 101 absorbs the P-polarized light while transmitting the S-polarized light. However, polarization cover 101 is not limited to the third exemplary embodiment. For example, polarization cover 101 may absorb or reflect the S-polarized light while transmitting the P-polarized light. Alternatively, polarization cover 101 may reflect the P-polarized light while transmitting the S-polarized light.

In the third exemplary embodiment, quarter-wave plate 124 and half-wave plate 125 are disposed between display device 110 and lens 121. However, the disposition of quarter-wave plate 124 and half-wave plate 125 is not limited to the third exemplary embodiment. For example, quarter-wave plate 124 and half-wave plate 125 may be disposed while the order of quarter-wave plate 124 and half-wave plate 125 is replaced.

Lens 121 has a configuration similar to that of the first exemplary embodiment. Specifically, lens 121 is located on the front side of vehicle 200 with respect to display device 110, and inclined downward with respect to reference beam Lc. Similarly to FIGS. 18A to 18D, lens 121 is the free-form surface lens having different curvatures in the X-axis direction and the Y-axis direction. A surface (incident surface) facing 110 of lens 121 has a concave shape that is concave to the side of display device 110 in the X-axis direction. In the incident surface of lens 121, the curvature in the Y-axis direction is smaller than the curvature in the X-axis direction. The surface (output surface), on the side of mirror 122, of lens 121 has the convex shape that is convex to the side of mirror 122 in the X-axis direction. The output surface of lens 121 has the concave shape in the Y-axis direction. In the third exemplary embodiment, similarly to the first exemplary embodiment, the incident surface of lens 121 has the shape so as not to have the refractive power in the Y-axis direction. In the incident surface of lens 121, a concave surface in which the curvature is smaller than that in the X-axis direction may be oriented toward the side of display device 110. In the incident surface of lens 121, the convex surface may be oriented toward the side of display device 110. Alternatively, the incident surface of lens 121 may have a shape that is locally concave, convex, or planar to the side of display device 110. Similarly to the first exemplary embodiment, the concave surface is oriented toward the side of mirror 122 in the Y-axis direction of the output surface of lens 121. Alternatively, the convex surface is oriented toward the side of mirror 122.

Similarly to the first exemplary embodiment, the output surface of lens 121 is inclined downward with respect to reference beam Lc compared with the incident surface of lens 121, and the output surface of lens 121 is formed into the wedge shape in the top-bottom and front-rear section of the vehicle. Consequently, even if the external light such as the sunlight is reflected by the output surface and incident surface of lens 121, the reflected light of the external light is not incident on viewpoint region 300. When the sectional shape, along the Y-axis direction, of lens 121 is formed into the wedge shape, the upper optical path length is longer than the lower optical path length, and the eccentric field curvature generated in mirror 122 can successfully be corrected.

Quarter-wave plate 123 is located on the front side of the vehicle with respect to lens 121. Quarter-wave plate 123 outputs the light incident from lens 121 while rotating the polarization of the light by a quarter of wavelength. Quarter-wave plate 123 is disposed while inclined downward with respect to reference beam Lc. Consequently, the external light such as the sunlight can be prevented from reaching viewpoint region 300 even if the external light is reflected by quarter-wave plate 123.

Half-wave plate 125 is located on the front side of the vehicle with respect to display device 110. Half-wave plate 125 outputs the light incident from display device 110 while rotating the polarization of the light by a half of wavelength. Half-wave plate 125 is disposed while inclined downward with respect to reference beam Lc. Consequently, the external light such as the sunlight can be prevented from reaching viewpoint region 300 even if the external light is reflected by half-wave plate 125.

Quarter-wave plate 124 is located on the front side of the vehicle with respect to half-wave plate 125. Quarter-wave plate 124 outputs the light incident from half-wave plate 125 while rotating the polarization of the light by a quarter of wavelength. Quarter-wave plate 124 is disposed while inclined downward with respect to reference beam Lc. Consequently, the external light such as the sunlight can be prevented from reaching viewpoint region 300 even if the external light is reflected by quarter-wave plate 124.

Mirror 122 is located on the front side of vehicle 200 with respect to quarter-wave plate 123. The reflection surface of mirror 122 is eccentrically disposed so as to reflect the beam output from quarter-wave plate 123 toward windshield 220. The reflection surface of mirror 122 has a concave shape. Consequently, the image displayed on display device 110 can be enlarged and visually recognized as virtual image I by observer D. Mirror 122 has a free-form surface shape. This is because distortion of the virtual image due to the reflection is corrected. This enables observer D to see good virtual image I in whole viewpoint region 300.

At this point, lens 121 is disposed at a higher position relative to a lower end of the reflection surface of mirror 122. This enables head-up display 100 to be thinned in a top-bottom direction of vehicle 200.

[3-2. Effects and Others]

Head-up display 100 of the third exemplary embodiment includes display device 110, projection optical system 120, and polarization cover 101. Display device 110 displays the image. Projection optical system 120 projects the image displayed on display device 110. Projection optical system 120 includes half-wave plate 125, quarter-wave plate 124, lens 121, quarter-wave plate 123, and mirror 122 in the order of the optical path from display device 110.

Figure 10:
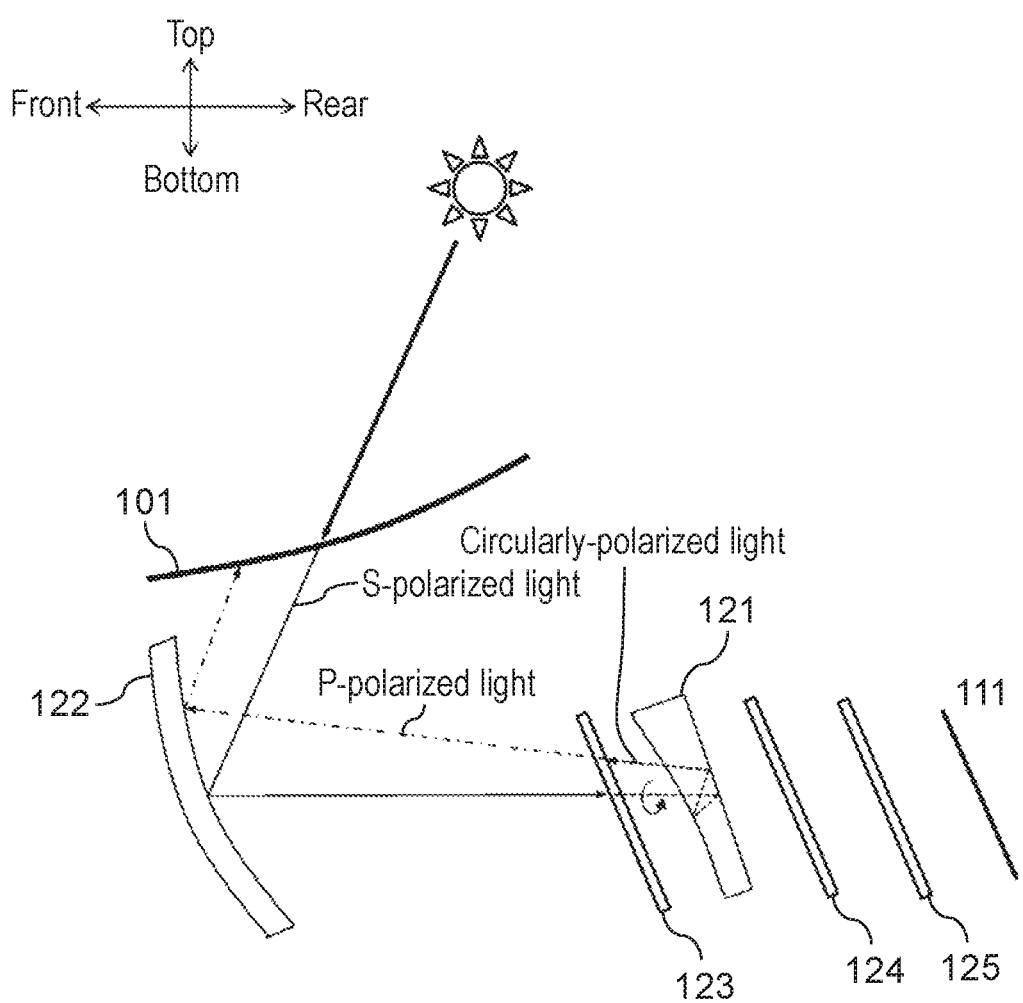
FIG. 10 is a view illustrating a state in which the external light is incident on the head-up display of the third exemplary embodiment.

In head-up display 100 of the third exemplary embodiment, quarter-wave plate 123 is provided on the front side of the vehicle with respect to lens 121 in addition to the configuration of the first exemplary embodiment. Polarization cover 101 is disposed between mirror 122 and windshield 220. Consequently, the luminance can sufficiently be decreased even if the external light such as the sunlight is multiple-reflected by the incident surface or output surface of lens 121 or the display surface of display device 110 to reach viewpoint region 300. As illustrated in FIG. 10, only the S-polarized component light in the sunlight is transmitted through polarization cover 101 to reach mirror 122. The S-polarized light incident on mirror 122 is transmitted through quarter-wave plate 123, and converted into the circularly-polarized light. The circularly-polarized light transmitted through quarter-wave plate 123 is multiple-reflected by the incident surface or output surface of lens 121 or the display surface of display device 110, and is incident on quarter-wave plate 123 again. The reflected light of the circularly-polarized light incident on quarter-wave plate 123 is converted into the P-polarized light by quarter-wave plate 123, and is incident on mirror 122. The P-polarized light reflected by mirror 122 is absorbed by polarization cover 101, and is not recognized as the stray light by observer D.

Figure 11:
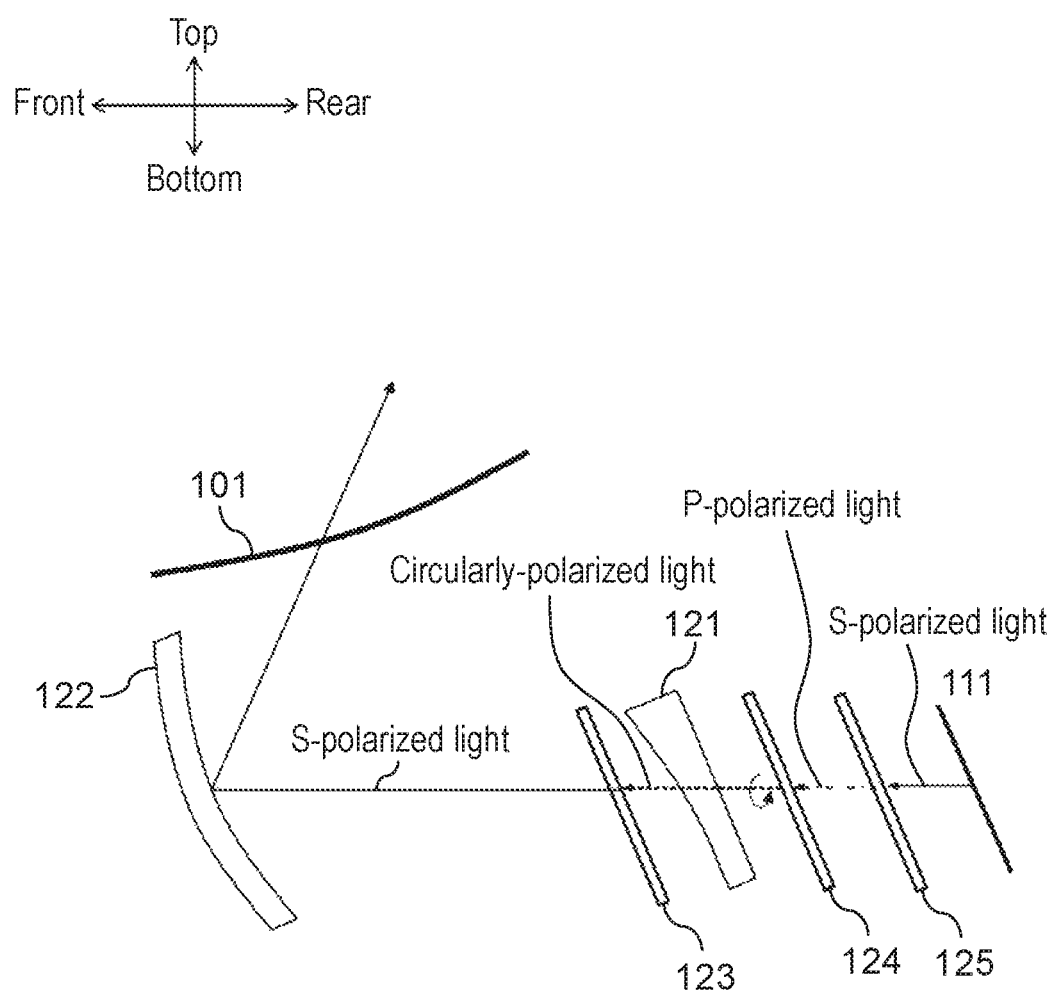
FIG. 11 is a view illustrating operation of the head-up display of the third exemplary embodiment.

In the third exemplary embodiment, furthermore, half-wave plate 125, quarter-wave plate 124, lens 121, quarter-wave plate 123, mirror 122, and polarization cover 101 are disposed in the order of the optical path from display device 110. Consequently, even in the case where the liquid crystal display device is used as display device 110, observer D can visually recognize good virtual image I with less degradation of the transmittance. As illustrated in FIG. 11, the display light output as the S-polarized light from display device 110 is converted into the P-polarized light by half-wave plate 125. The light output from half-wave plate 125 is converted into the circularly-polarized light by quarter-wave plate 124. The light output from quarter-wave plate 124 is transmitted through lens 121, converted into the S-polarized light by quarter-wave plate 123, and is incident on mirror 122. The S-polarized light reflected by mirror 122 is visually recognized as virtual image I by observer D without being absorbed by polarization cover 101. In the third exemplary embodiment, the S-polarized light is used as the display light output from display device 110. However, in the case where the display light is the P-polarized light, the similar effect can be obtained by removing half-wave plate 125.

Fourth Exemplary Embodiment

Head-up display 100 according to a fourth exemplary embodiment differs from that of the third exemplary embodiment in that head-up display 100 of the fourth exemplary embodiment includes quarter-wave film 126 while not including quarter-wave plate 123. Points different from the third exemplary embodiment will mainly be described below with reference to FIGS. 12 to 14, and the description about the similar configuration will be omitted.

[4-1. Configuration]

Figure 12:
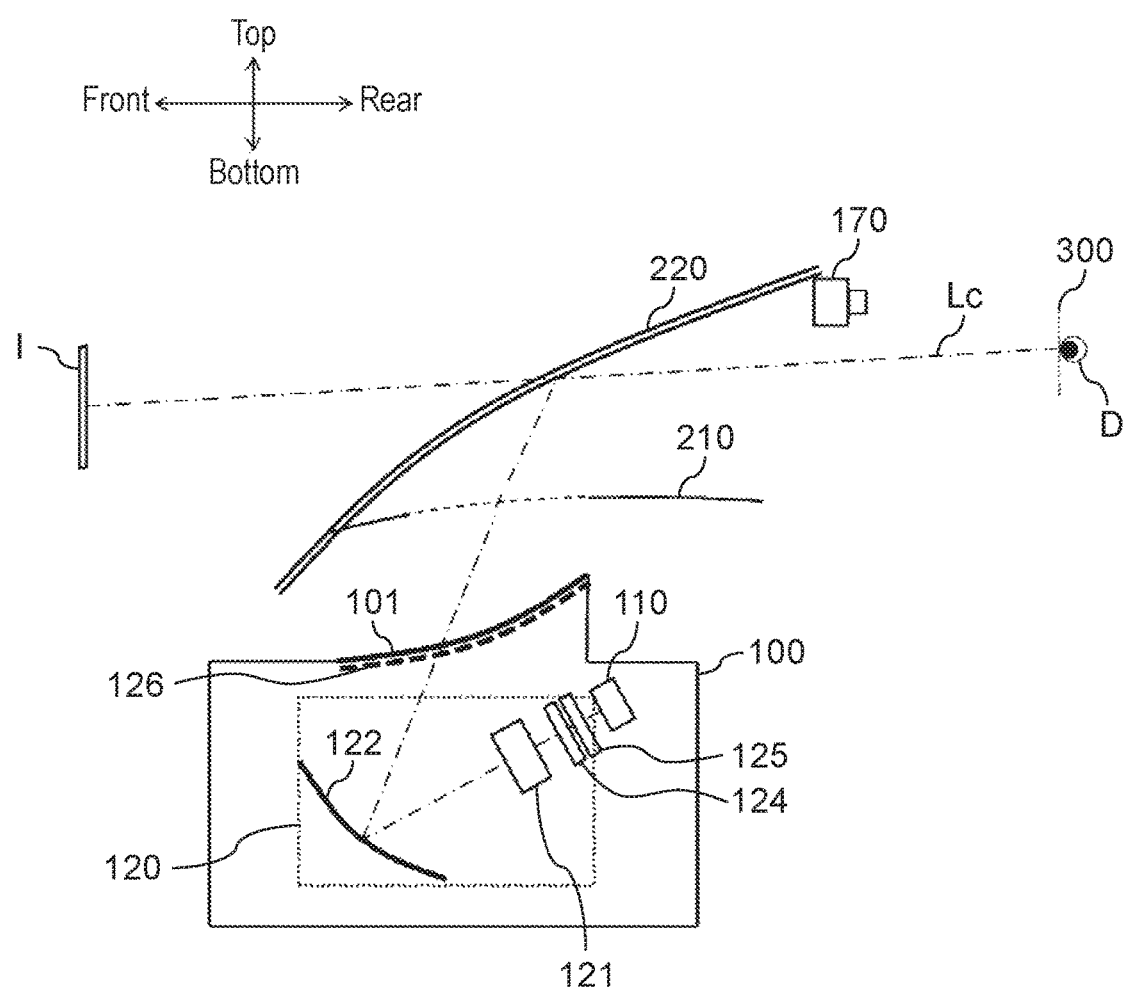
FIG. 12 is a schematic diagram illustrating a configuration of a head-up display according to a fourth exemplary embodiment.

FIG. 12 is a schematic diagram illustrating an optical path for describing head-up display 100 of the fourth exemplary embodiment. As illustrated in FIG. 12, head-up display 100 includes polarization cover 101 to which quarter-wave film 126 is cemented, display device 110, and projection optical system 120. Projection optical system 120 includes lens 121, mirror 122 having the concave reflection surface, quarter-wave plate 124, and half-wave plate 125.

Projection optical system 120 projects the image displayed by display device 110 onto windshield 220. Specifically, the image light displayed on display device 110 is incident on mirror 122 through quarter-wave plate 124, half-wave plate 125, and lens 121. The image light reflected by mirror 122 is projected onto windshield 220 through quarter-wave film 126 and polarization cover 101. In the fourth exemplary embodiment, polarization cover 101 absorbs the P-polarized light while transmitting the S-polarized light. However, polarization cover 101 is not limited to the fourth exemplary embodiment. For example, polarization cover 101 may absorb or reflect the S-polarized light while transmitting the P-polarized light. Alternatively, polarization cover 101 may reflect the P-polarized light while transmitting the S-polarized light. It is not necessary that quarter-wave film 126 and polarization cover 101 be cemented together, but quarter-wave film 126 and polarization cover 101 may be provided separately from each other. Instead of quarter-wave film 126, quarter-wave plate may be disposed between mirror 122 and polarization cover 101.

In the fourth exemplary embodiment, similarly to the third exemplary embodiment, quarter-wave plate 124 and half-wave plate 125 are disposed between display device 110 and lens 121. The disposition of quarter-wave plate 124 and half-wave plate 125 is not limited to the fourth exemplary embodiment, but quarter-wave plate 124 and half-wave plate 125 may be disposed while the order of quarter-wave plate 124 and half-wave plate 125 is replaced.

Lens 121 has a configuration similar to that of the first exemplary embodiment. Specifically, lens 121 is located on the front side of vehicle 200 with respect to display device 110, and inclined downward with respect to reference beam Lc. Similarly to FIGS. 18A to 18D, lens 121 is the free-form surface lens having different curvatures in the X-axis direction and the Y-axis direction. A surface (incident surface) facing 110 of lens 121 has a concave shape that is concave to the side of display device 110 in the X-axis direction. In the incident surface of lens 121, the curvature in the Y-axis direction is smaller than the curvature in the X-axis direction. The surface (output surface), on the side of mirror 122, of lens 121 has the convex shape that is convex to the side of mirror 122 in the X-axis direction. The output surface of lens 121 has the concave shape in the Y-axis direction. In the fourth exemplary embodiment, similarly to the first exemplary embodiment, the incident surface of lens 121 has the shape so as not to have the refractive power in the Y-axis direction. However, the incident surface of lens 121 is not limited to the fourth exemplary embodiment. For example, the incident surface of lens 121 may be a concave surface in which the curvature of the incident surface of lens 121 in the Y-axis direction is smaller than that of the X-axis direction of the incident surface. Alternatively, the incident surface of lens 121 may be convex to the side of display device 110 in the Y-axis direction. Alternatively, the incident surface of lens 121 may have a shape that is locally concave, convex, or planar to the side of display device 110. Similarly to the first exemplary embodiment, the incident surface of lens 121 is concave to the side of mirror 122 in the Y-axis direction. Alternatively, the incident surface of lens 121 may be convex to the side of mirror 122 in the Y-axis direction.

Similarly to the first exemplary embodiment, the output surface of lens 121 is inclined downward with respect to reference beam Lc compared with the incident surface of lens 121, and the output surface of lens 121 is formed into the wedge shape in the top-bottom and front-rear section of the vehicle. Consequently, even if the external light such as the sunlight is reflected by the output surface and incident surface of lens 121, the reflected light of the external light is not incident on viewpoint region 300. When the sectional shape, along the Y-axis direction, of lens 121 is formed into the wedge shape, the upper optical path length is longer than the lower optical path length. Consequently, the eccentric field curvature generated in mirror 122 can successfully be corrected.

Quarter-wave film 126 is cemented to the surface side, in the vehicle bottom direction, of polarization cover 101. Quarter-wave film 126 outputs the light incident from mirror 122 while rotating the polarization of the light by a quarter of wavelength. At this point, because polarization cover 101 has the curved shape, quarter-wave film 126 also has the curved shape. Consequently, the external light such as the sunlight is prevented from being reflected between polarization cover 101 and quarter-wave film 126 and from reaching viewpoint region 300.

Mirror 122 is located on the front side of vehicle 200 with respect to lens 121. The reflection surface of mirror 122 is eccentrically disposed so as to reflect the beam output from lens 121 toward windshield 220. The reflection surface of mirror 122 has a concave shape. Consequently, the image displayed on display device 110 can be enlarged and visually recognized as virtual image I by observer D. Mirror 122 has a free-form surface shape. This is because the distortion of virtual image due to the reflection is corrected such that good virtual image I is observed in whole viewpoint region 300.

At this point, lens 121 is disposed at a higher position relative to a lower end of the reflection surface of mirror 122. This enables head-up display 100 to be thinned in a top-bottom direction of vehicle 200.

[4-2. Effects and Others]

Head-up display 100 of the fourth exemplary embodiment includes display device 110, projection optical system 120, and polarization cover 101. Display device 110 displays the image. Projection optical system 120 projects the image displayed on display device 110. Quarter-wave film 126 is cemented to polarization cover 101. Projection optical system 120 includes half-wave plate 125, quarter-wave plate 124, lens 121, and mirror 122 in the order of the optical path from display device 110.

Figure 13:
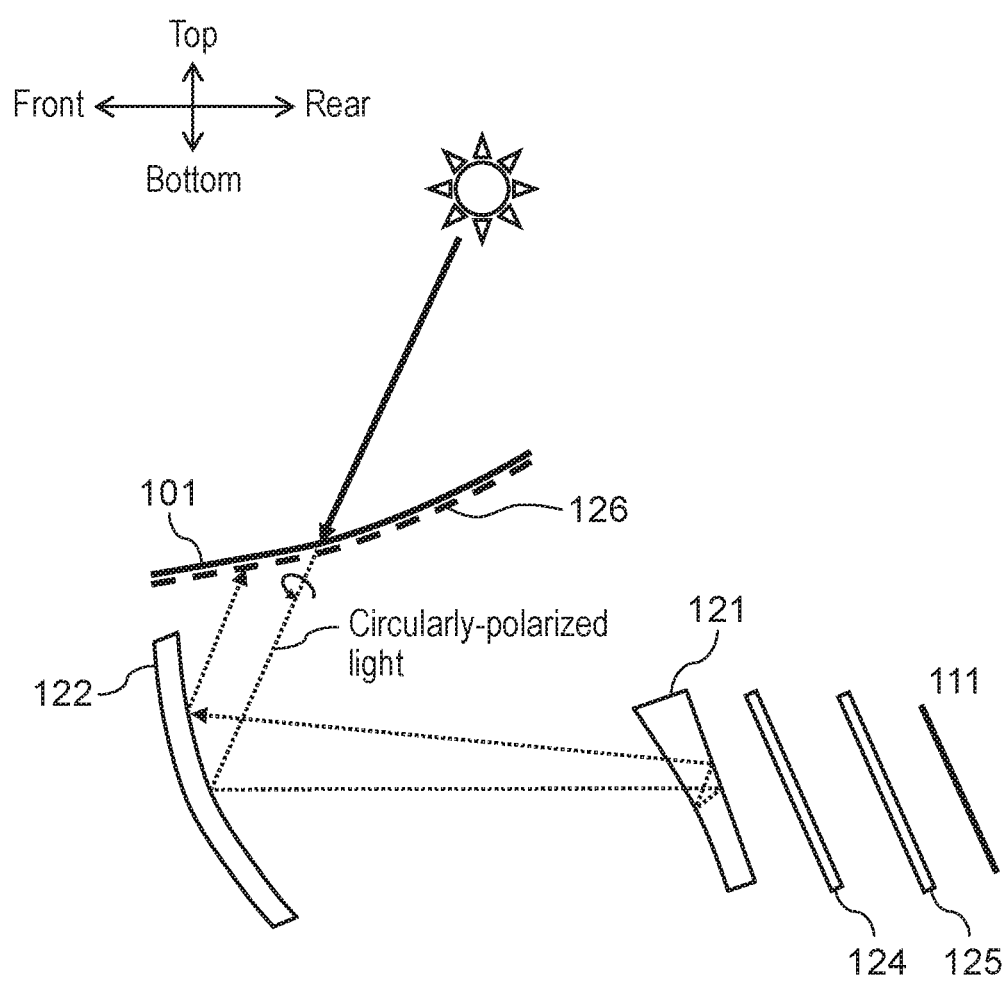
FIG. 13 is a view illustrating a state in which the external light is incident on the head-up display of the fourth exemplary embodiment.

In head-up display 100 of the fourth exemplary embodiment, quarter-wave film 126 is disposed while cemented below polarization cover 101 in addition to the effects of the first exemplary embodiment. Consequently, the luminance can sufficiently be decreased even if the external light such as the sunlight is multiple-reflected by the incident surface or output surface of lens 121 or the display surface of display device 110 to reach viewpoint region 300. As illustrated in FIG. 13, the sunlight is incident on quarter-wave film 126 through polarization cover 101. Consequently, only the S-polarized component light in the sunlight reaches quarter-wave film 126. The S-polarized light transmitted through quarter-wave film 126 is converted into the circularly-polarized light, and reaches mirror 122. The light reflected by mirror 122 is multiple-reflected between the incident surface and the output surface of lens 121, and is incident on mirror 122 again. The circularly-polarized light reflected by mirror 122 is converted into the P-polarized light by quarter-wave film 126, and absorbed by polarization cover 101. Thus, the P-polarized light is not recognized as the stray light by observer D.

Figure 14:
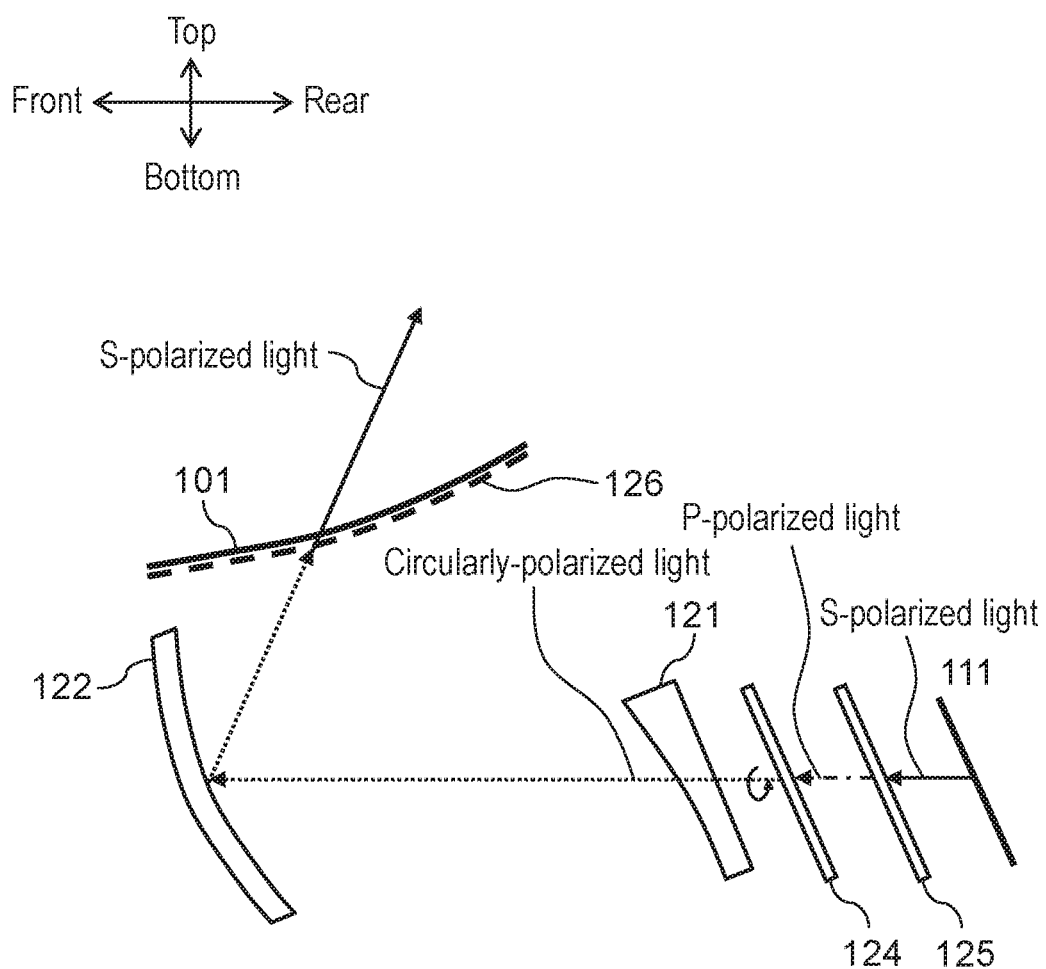
FIG. 14 is a view illustrating the operation of the head-up display of the fourth exemplary embodiment.

In the fourth exemplary embodiment, half-wave plate 125, quarter-wave plate 124, lens 121, mirror 122, quarter-wave film 126, and polarization cover 101 are disposed in the order of the optical path from display device 110. Consequently, even in the case where the liquid crystal display device is used as display device 110, observer D can visually recognize good virtual image I with less degradation of the transmittance. As illustrated in FIG. 14, the display light output as the S-polarized light from display device 110 is converted into the P-polarized light by half-wave plate 125. The light output from half-wave plate 125 is converted into the circularly-polarized light by quarter-wave plate 124. The light output from quarter-wave plate 124 is incident on mirror 122 through lens 121. Because the circularly-polarized light reflected by mirror 122 is converted into the S-polarized light by quarter-wave film 126, the S-polarized light is visually recognized as virtual image I by observer D without being absorbed by polarization cover 101. In the fourth exemplary embodiment, the S-polarized light is used as the display light output from display device 110. However, the display light is not limited to the S-polarized light. In the case where the display light is the P-polarized light, the similar effect can be obtained by removing half-wave plate 125 from the configuration of the fourth exemplary embodiment.

In the fourth exemplary embodiment, because quarter-wave film 126 and polarization cover 101 are cemented together, the multiple reflection of quarter-wave plate 123 and lens 121 needs not to be considered unlike the third exemplary embodiment.

Fifth Exemplary Embodiment

Head-up display 100 according to a fifth exemplary embodiment differs from that of the first to fourth exemplary embodiments in that the virtual image is visually recognized through combiner 127. Points different from the first to fourth exemplary embodiments will mainly be described below with reference to FIGS. 15 to 17, and the description about the similar configuration will be omitted.

[5-1. Configuration]

Figure 15:
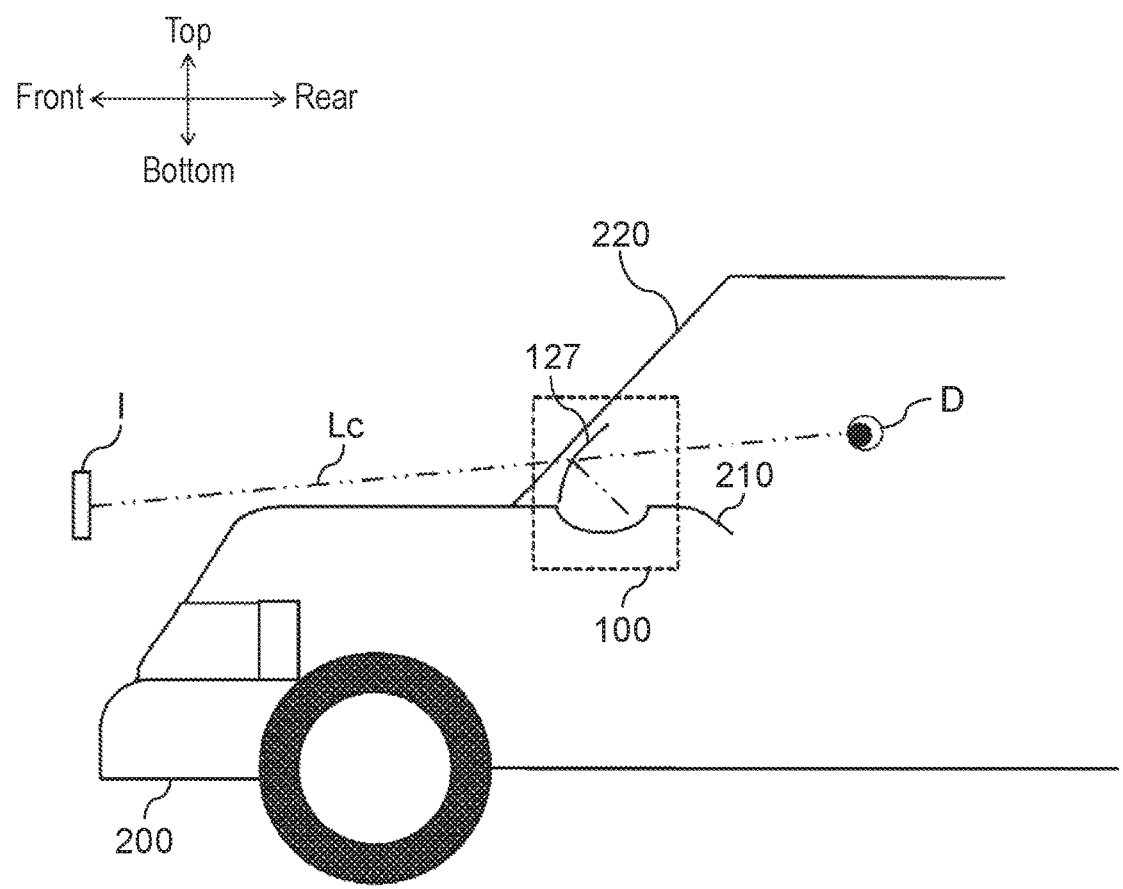
FIG. 15 is schematic diagram illustrating a vehicle equipped with a head-up display of a fifth exemplary embodiment.

FIG. 15 is a view schematically illustrating a section of vehicle 200 equipped with head-up display 100 of the present disclosure. As illustrated in FIG. 15, head-up display 100 is disposed inside and outside dashboard 210 below windshield 220 of vehicle 200. Observer D recognizes the image projected from head-up display 100 as virtual image I through combiner 127.

Figure 16:
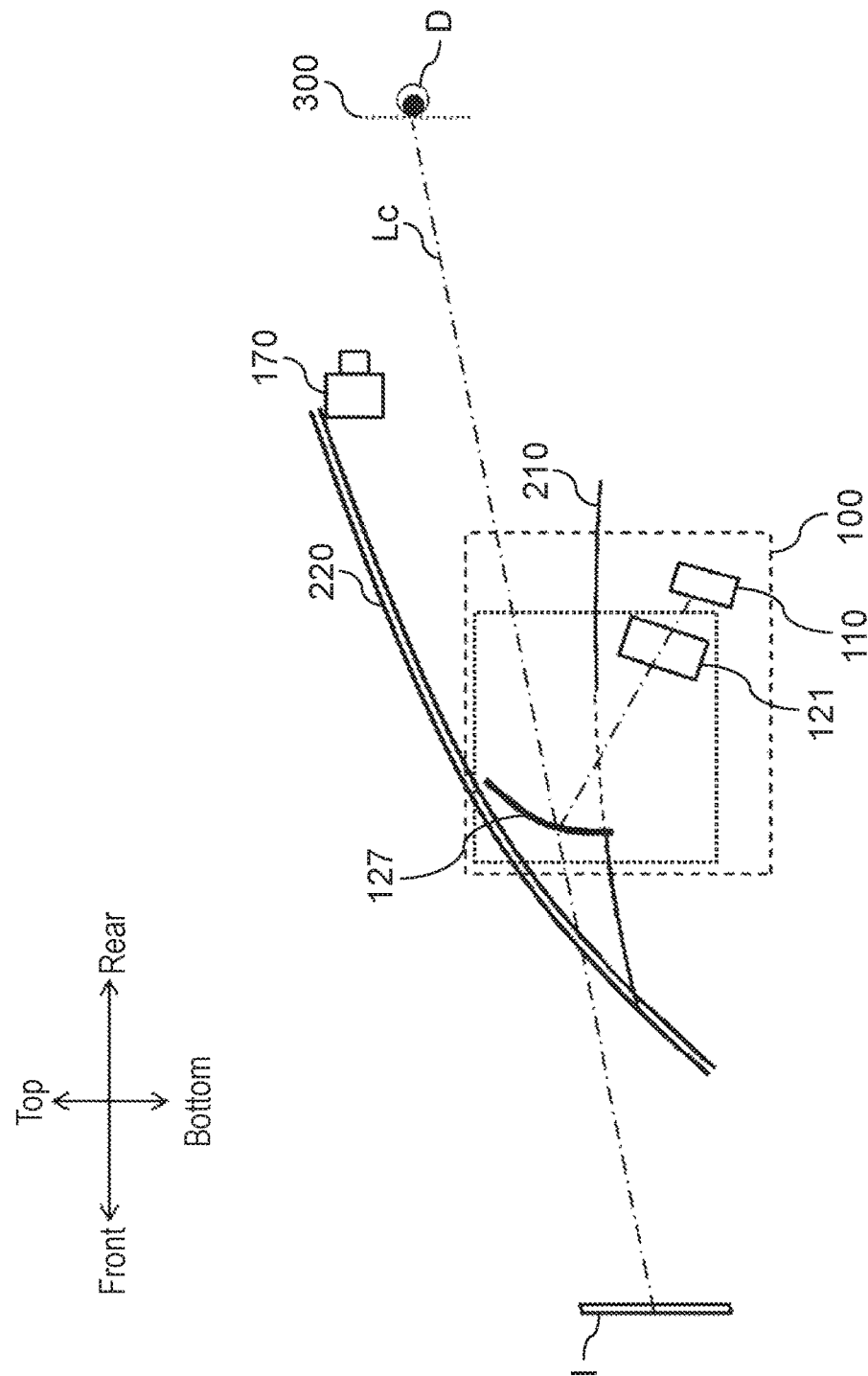
FIG. 16 is a schematic diagram illustrating the configuration of the head-up display of the fifth exemplary embodiment.

FIG. 16 is a schematic diagram illustrating an optical path for describing head-up display 100 of the fifth exemplary embodiment. As illustrated in FIG. 16, head-up display 100 includes display device 110 and projection optical system 120. Projection optical system 120 includes lens 121 and combiner 127. Combiner 127 is an optical member having transparency and reflectivity, and includes a concave reflection surface.

Projection optical system 120 projects the image displayed on display device 110 onto observer D as virtual image I. Specifically, the image light displayed on display device 110 is incident on combiner 127 through lens 121. The image light incident on combiner 127 is reflected by combiner 127, and projected onto viewpoint region 300 of observer D. The combiner 127 has the transparency, so that observer D can check the front of the vehicle through combiner 127. This enables observer D to visually recognize virtual image I without disturbing the front viewing field. In the fifth exemplary embodiment, lens 121 and display device 110 are disposed below dashboard 210. However, the present disclosure is not limited to the configuration of the fifth exemplary embodiment. For example, lens 121 and display device 110 may be disposed such that a part or whole of head-up display 100 is disposed above dashboard 210.

Lens 121 is located on the front side of vehicle 200 with respect to display device 110, and inclined downward with respect to reference beam Lc.

As illustrated in FIGS. 19A to 19D, lens 121 is the free-form surface lens in which the X-axis direction and the Y-axis direction differ from each other in the curvature. A surface (incident surface) facing 110 of lens 121 has a concave shape that is concave to the side of display device 110 in the X-axis direction. In the incident surface of lens 121, the curvature in the Y-axis direction is smaller than the curvature in the X-axis direction. The surface (output surface), on the side of combiner 127, of lens 121 has the convex shape that is convex to the side of combiner 127 in the X-axis direction. The output surface of lens 121 has a concave shape in the Y-axis direction. In the fifth exemplary embodiment, by way of example, the incident surface of lens 121 has the shape so as not to have refractive power in the Y-axis direction. In the incident surface of lens 121, a concave surface in which the curvature is smaller than that in the X-axis direction may be oriented toward display device 110. In the incident surface of lens 121, the convex surface may be oriented toward display device 110. Alternatively, the incident surface of lens 121 may have a shape that is locally concave and convex to the side of display device 110.

Figure 17:
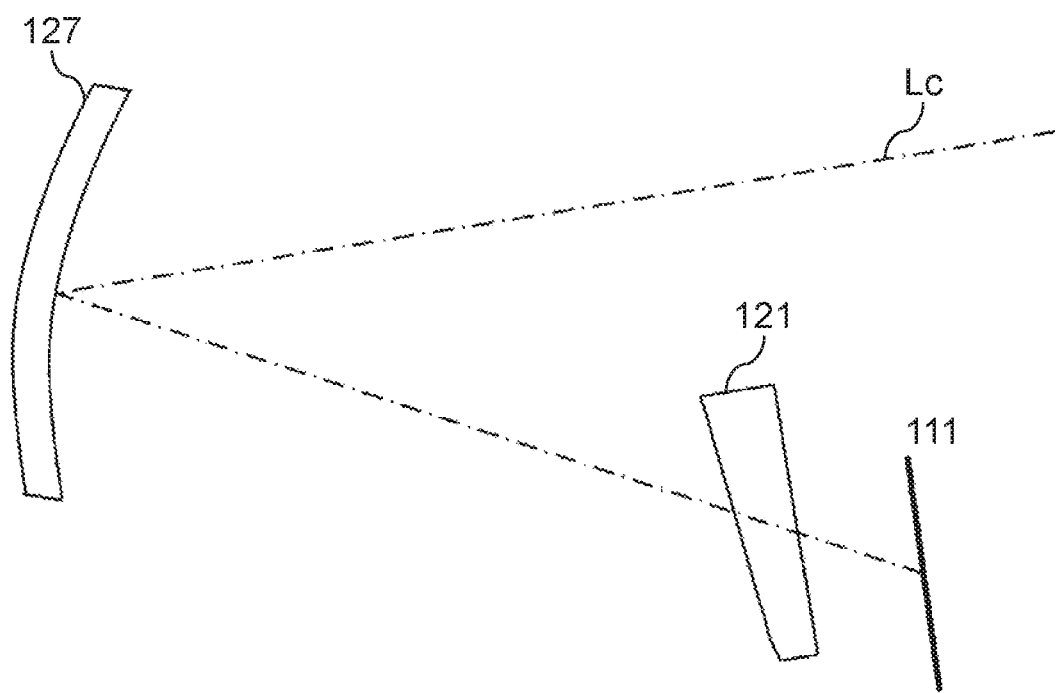
FIG. 17 is a view illustrating the operation of the head-up display of the fifth exemplary embodiment.
Figure 18A:
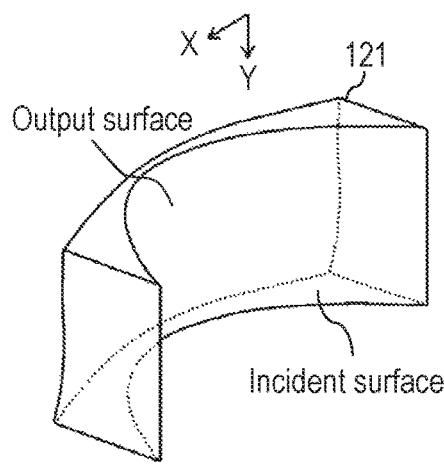
FIG. 18A is a view illustrating a lens shape of the first to fourth exemplary embodiments.
Figure 18B:
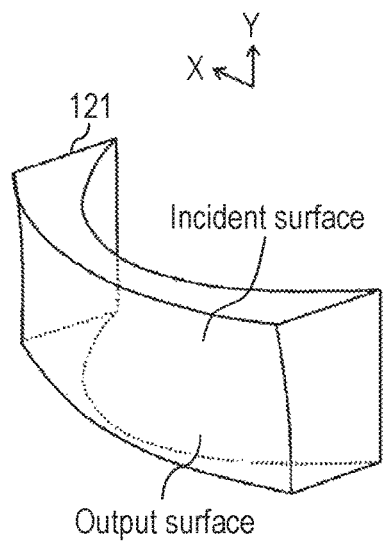
FIG. 18B is a view illustrating a lens shape of the first to fourth exemplary embodiments.
Figure 18C:
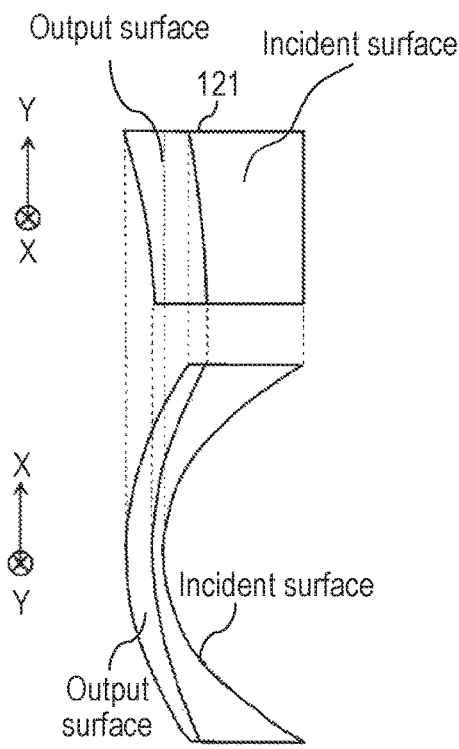
FIG. 18C is a view illustrating a lens shape of the first to fourth exemplary embodiments.
Figure 18D:
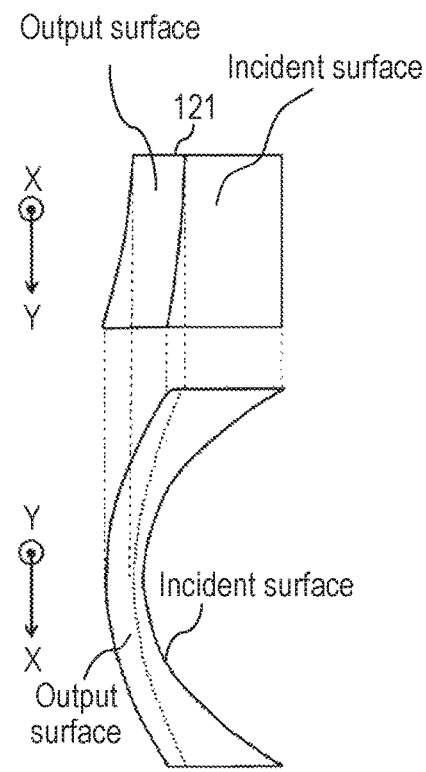
FIG. 18D is a view illustrating a lens shape of the first to fourth exemplary embodiments.
Figure 19A:
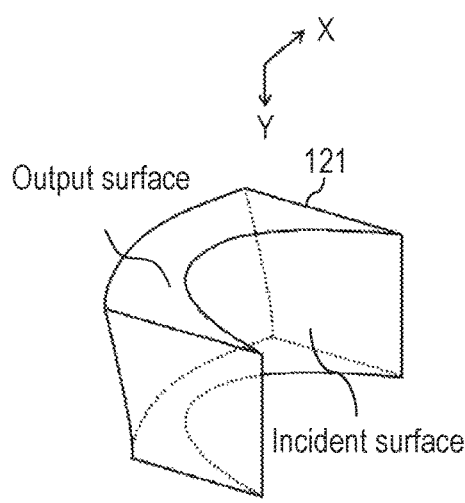
FIG. 19A is a view illustrating a lens shape of the fifth exemplary embodiment.
Figure 19B:
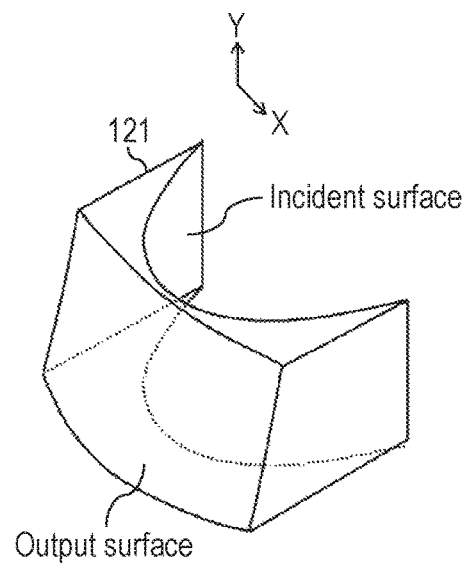
FIG. 19B is a view illustrating a lens shape of the fifth exemplary embodiment.
Figure 19C:
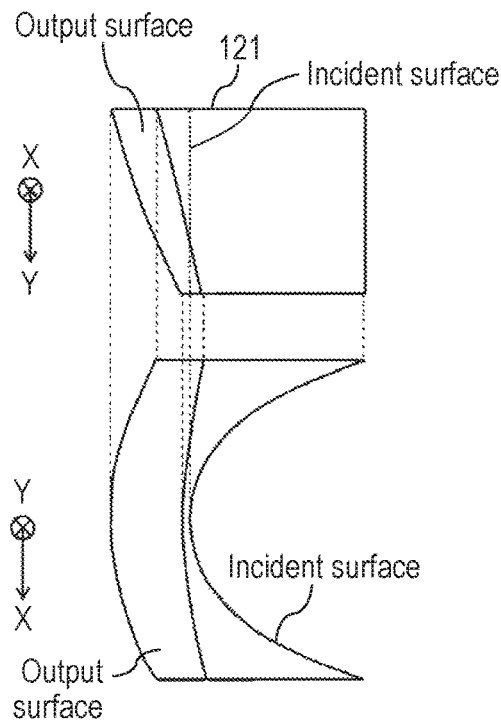
FIG. 19C is a view illustrating a lens shape of the fifth exemplary embodiment.
Figure 19D:
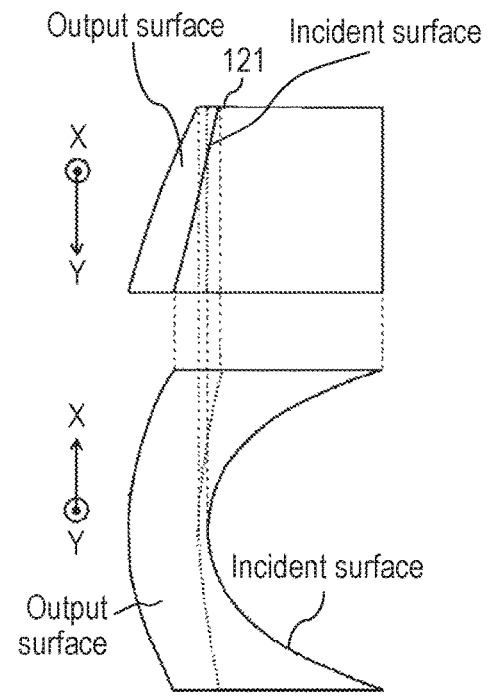
FIG. 19D is a view illustrating a lens shape of the fifth exemplary embodiment.

In the fifth exemplary embodiment, the output surface of lens 121 has the convex shape having the small curvature in the Y-axis direction. Alternatively, the output surface of lens 121 may have the concave shape in the Y-axis direction. As illustrated in FIG. 17, the output surface of lens 121 is inclined downward with respect to reference beam Lc compared with the incident surface of lens 121. Consequently, even if the external light such as the sunlight is reflected by the output surface or incident surface of lens 121, the reflected light of the external light is not incident on viewpoint region 300. The sectional shape, along the Y-axis direction, of lens 121 is the wedge shape. Consequently, the upper optical path length is longer than the lower optical path length, so that the eccentric field curvature generated in combiner 127 can successfully be corrected.

Combiner 127 is located on the front side of vehicle 200 with respect to lens 121. The reflection surface of combiner 127 is eccentrically disposed so as to reflect the beam output from lens 121 toward observer D. The reflection surface of combiner 127 has the concave shape. Consequently, the image displayed on display device 110 can be enlarged and visually recognized as virtual image I by observer D. Combiner 127 also has the free-form surface shape. This enables the correction of the distortion of the virtual image due to the reflection. Consequently, the correction is performed such that observer D sees good virtual image I in whole viewpoint region 300.

[5-2. Effects and Others]

Head-up display 100 of the fifth exemplary embodiment includes display device 110 and projection optical system 120. Display device 110 displays the image. Projection optical system 120 projects the image displayed on display device 110. Projection optical system 120 includes lens 121 and combiner 127 in the order of the optical path from display device 110.

Head-up display 100 of the fifth exemplary embodiment, the image displayed on display device 110 is presented as virtual image I to observer D through combiner 127 in addition to the effects of the first exemplary embodiment. Consequently, observer D can visually recognize the image displayed on display device 110 without obstructing a front viewing field of observer D.

The output surface of lens 121 in the Y-axis direction is formed into the free-form surface shape having no symmetry. Consequently, the asymmetric distortion generated in combiner 127 can successfully be corrected. FIGS. 18A to 18D are views illustrating the shape of lens 121 of the first to fourth exemplary embodiments. FIGS. 19A to 19D are views illustrating the shape of lens 121 of the fifth exemplary embodiment.

However, the lens shapes in FIGS. 18A to 18D and 19A to 19D are not limited to the exemplary embodiments. The shape of lens 121 in FIGS. 18A to 18D may be applied to the fifth exemplary embodiment. The shape of lens 121 in FIGS. 19A to 19D may be applied to the first to fourth exemplary embodiments.

Other Exemplary Embodiments

The first to fifth exemplary embodiments have been described as illustration of the technique disclosed in the present application. However, the technique of the present disclosure is not limited to the first to fifth exemplary embodiments, but can be applied to exemplary embodiments in which modifications, replacements, additions, omissions, and the like are made. Additionally, components described in the first to fifth exemplary embodiments can be combined to obtain a new exemplary embodiment.

In the first to fourth exemplary embodiments, by way of example, lens 121 is used as the refractive optical system provided between display device 110 and mirror 122. However, the refractive optical system is not limited to lens 121 that is one lens element. For example, in the refractive optical system, a plurality of lens elements may be disposed between display device 110 and mirror 122. In the case where the plurality of lens elements are disposed, desirably the surface, facing the display device, of the lens element on which the light output from the display device is firstly incident is the concave surface in the X-axis direction.

In the first to fourth exemplary embodiments, one mirror is disposed as projection optical system 120. Alternatively, at least two mirrors may be disposed. The additional mirror may be disposed on the front side of the vehicle with respect to mirror 122 or in the inside and outside direction (in FIG. 3, a direction perpendicular to the paper plane) of the vehicle.

In the first to fourth exemplary embodiments, only lens 121 is disposed between display device 110 and mirror 122 as the lens element of projection optical system 120. However, the configuration of head-up display 100 is not limited to the first to fourth exemplary embodiments. For example, a lens may additionally be disposed between mirror 122 and windshield 220.

In the first to fourth exemplary embodiments, mirror 122 of head-up display 100 has the rotationally asymmetrical shape. However, mirror 122 is not limited to the mirror having the rotationally asymmetrical shape. For example, mirror 122 may have what is called a saddle-type surface shape in which the X-axis direction differs from the Y-axis direction in a sign of the curvature.

The surface shape of lens 121 of the first to fourth exemplary embodiments is not limited to the free-form surface shape. For example, the surface shape of lens 121 may have a toroidal, anamorphic, or cylindrical shape, or the lens having the toroidal, anamorphic, or cylindrical shape may eccentrically be disposed with respect to reference beam Lc.

In the first to fourth exemplary embodiments, the whole incident surface of lens 121 is not necessarily formed into the concave surface in the X-axis direction, but may locally have the concave shape.

In the first to fourth exemplary embodiments, the incident surface of lens 121 is not necessarily formed into the planar surface in the Y-axis direction. The incident surface of lens 121 may be formed into the convex or concave surface, or locally have the curved surface shape in the Y-axis direction.

In the first to fourth exemplary embodiments, the output surface of lens 121 is not necessarily formed into the concave surface that is oriented toward mirror 122 in the Y-axis direction. The output surface of lens 121 may be formed into the convex or planar surface, or locally have the curved surface shape in the Y-axis direction.

In the first to fourth exemplary embodiments, the shape of the reflection surface of mirror 122 is not limited to the free-form surface shape. The reflection surface of mirror 122 may have a spherical, aspherical, toroidal, or anamorphic shape, or the lens having the spherical, aspherical, toroidal, or anamorphic shape may eccentrically be disposed with respect to reference beam Lc.

In the second to fourth exemplary embodiments, polarization cover 101 is disposed by way of example. However, the present disclosure is not limited thereto. For example, polarization cover 101 may be one in which a cover and an optical member having the polarization action are disposed separately from each other. Instead of polarization cover 101, an optical member having polarization action may be disposed in projection optical system 120. At this point, desirably the wave plate is not disposed on the rear side of the optical member having the polarization action in the order of the optical path from display device 110.

In the third and fourth exemplary embodiments, display device 110, quarter-wave plate 124, and half-wave plate 125 are disposed separately from each other by way of example. Alternatively, display device 110, quarter-wave plate 124, and half-wave plate 125 may be disposed while cemented to one another.

In the third and fourth exemplary embodiments, quarter-wave plate 124 and half-wave plate 125 are disposed separately from each other by way of example. Alternatively, one wave plate having similar effects may be disposed as quarter-wave plate 124 and half-wave plate 125.

In the fourth exemplary embodiment, quarter-wave film 126 is cemented to polarization cover 101 by way of example. Alternatively, a curved quarter-wave plate may be disposed. The curved quarter-wave plate has the effect similar to that of polarization cover 101. That is, the external light reflected by the quarter-wave plate can be prevented from reaching viewpoint region 300 of observer D.

In the fifth exemplary embodiment, one lens element is disposed between display device 110 and combiner 127 by way of example. Alternatively, a plurality of lens elements may be disposed. In the case where the plurality of lens elements exist, desirably a first incident surface is a concave surface in the X-axis direction. As used herein, the first incident surface means a surface, facing the display device, of the lens element on which the light output from the display device is firstly incident. A reflection member may be disposed between display device 110 and combiner 127.

In the fifth exemplary embodiment, display device 110 and lens 121 are disposed below dashboard 210. Alternatively, display device 110 and lens 121 may be disposed above dashboard 210.

In the fifth exemplary embodiment, a part of head-up display 100 is disposed below dashboard 210. Alternatively, a part of head-up display 100 may be disposed above dashboard 210.

The above exemplary embodiments are illustrations of the technique of the present disclosure. Therefore, various changes, replacements, additions, or omissions may be made to the exemplary embodiments within the scope of claims or their equivalents.

Lens 121 in FIGS. 18A to 19D has a rectangular outer shape projected onto the XY-plane. However, lens 121 is not limited to the rectangular outer shape. For example, lens 121 may have an outer shape in which lens 121 is easily held by head-up display 100.

INDUSTRIAL APPLICABILITY

The present disclosure is applicable to a head-up display that uses a refractive optical system such as a lens. Specifically, the present disclosure is applicable to a head-up display for a vehicle.

REFERENCE MARKS IN THE DRAWINGS 100 head-up display
101 polarization cover (polarization member)
110 display device
111 displayed image
120 projection optical system
121 lens (refraction lens)
122 mirror
123 quarter-wave plate (first polarizer)
124 quarter-wave plate (second polarizer)
125 half-wave plate (third polarizer)
126 quarter-wave film (first polarizer)
127 combiner
170 camera
200 vehicle
210 dashboard
220 windshield (reflection member)
300 viewpoint region
D observer
I virtual image

The invention claimed is:
1. A head-up display that causes an observer to visually recognize a virtual image, the head-up display comprising:
   a display device that displays an image; and
   a projection optical system that projects the image displayed on the display device onto the observer, the projection optical system including a refraction lens, wherein
   a reference beam that reaches a center of a viewpoint region of the observer corresponds to a center of the virtual image, a reference outside beam that reaches the center of the viewpoint region of the observer corresponds to a vehicle outside end of the virtual image, an incident surface of the refraction lens faces the display device on the reference beam, an output surface of the refraction lens is on an opposite side to the incident surface on the reference beam, an origin is an intersection of the reference beam and the incident surface, an X-axis direction is a straight line including the origin and an intersection of a tangential plane of the incident surface at the origin and the reference outside beam, and a Y-axis direction is perpendicular to the X-axis direction in the tangential plane, the refraction lens is disposed while inclined with respect to the reference beam, the incident surface has a concave surface facing the display device in the X-axis direction, and a curvature of the incident surface in the Y-axis direction is smaller than a curvature of the incident surface in the X-axis direction.

2. The head-up display according to claim 1, wherein the output surface is a convex surface that is convex to a side of the output surface in the X-axis direction.

3. The head-up display according to claim 1, wherein in the Y-axis direction, inclination of the output surface to a plane perpendicular to the reference beam is larger than inclination of the incident surface to the plane perpendicular to the reference beam.

4. The head-up display according to claim 1, wherein a curvature of the output surface in the Y-axis direction is smaller than a curvature of the output surface in the X-axis direction.

5. The head-up display according to claim 1, wherein the incident surface of the refraction lens is subjected to anti-reflective coating.

6. The head-up display according to claim 1, wherein the output surface of the refraction lens is subjected to anti-reflective coating.

7. The head-up display according to claim 1, wherein inclination of the output surface in the Y-axis direction to the reference beam is larger than inclination of the incident surface in the Y-axis direction to the reference beam.

8. The head-up display according to claim 1, wherein the projection optical system projects the virtual image onto a windshield.

9. The head-up display according to claim 1, wherein the projection optical system includes a reflection member having transparency and reflectivity.

10. A free-form surface lens used in an imaging optical system that makes a conjugate relationship between a first image surface and a second image surface, the free-form surface lens comprising:

a first optical surface; and a second optical surface, wherein a reference beam that passes through the first optical surface and the second optical surface corresponds to a center of the second image surface, and an X-axis direction and a Y-axis direction are orthogonal to each other in a tangential plane of the first optical surface at an intersection of the reference beam and the first optical surface, the first optical surface is a concave surface in the X-axis direction, and the curvature of the first optical surface in the Y-axis direction is smaller than the curvature of the first optical surface in the X-axis direction.

11. The free-form surface lens according to claim 10, wherein in the Y-axis direction, an angle formed between the first optical surface and the reference beam is larger than an angle formed between the second optical surface and the reference beam.

12. The free-form surface lens according to claim 10, wherein the second optical surface is a convex surface in the X-axis direction, the curvature of the second optical surface in the X-axis direction is smaller than the curvature of the first optical surface in the X-axis direction, and the curvature of the second optical surface in the Y-axis direction is smaller than the curvature of the second optical surface in the X-axis direction.

13. The free-form surface lens according to claim 10, wherein a sectional shape is a wedge shape in a plane passing through an intersection of the reference beam and the first optical surface and is perpendicular to the X-axis direction.

14. The free-form surface lens according to claim 10, wherein a length in the X-axis direction of an image formed by the imaging optical system when the reference beam passes through the free-form surface lens is longer than a length in the Y-axis direction.

15. The free-form surface lens according to claim 10, wherein a length in the X-axis direction of the first optical surface is longer than a length in the Y-axis direction of the first optical surface.

16. The free-form surface lens according to claim 10, wherein the free-form surface lens is a concave lens as a whole.

17. The free-form surface lens according to claim 10, wherein the free-form surface lens is disposed on an optical path connecting the first image surface and the second image surface, on the optical path connecting the first image surface and the second image surface, the first image surface, the first optical surface, the second optical surface, and the second image surface are disposed in this order, and the first image surface is smaller than the second image surface in an area.

18. The free-form surface lens according to claim 10 disposed in a head-up display.

* * * * *